US012548499B2

(12) United States Patent

Kim et al.

(10) Patent No.: US 12,548,499 B2
(45) Date of Patent: Feb. 10, 2026

(54) DISPLAY DRIVING DEVICE AND DISPLAY DEVICE INCLUDING THE SAME

(71) Applicant: LG Display Co., Ltd., Seoul (KR)

(72) Inventors: Yong Suk Kim, Paju-si (KR); Jun Park, Paju-si (KR); Byung Hee Kim, Paju-si (KR); Lae Bong Jang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/958,935

(22) Filed: Nov. 25, 2024

(65) Prior Publication Data

US 2025/0182682 A1 Jun. 5, 2025

(30) Foreign Application Priority Data

Dec. 4, 2023 (KR) ........................ 10-2023-0173180

(51) Int. Cl.
*G09G 3/32* (2016.01)

(52) U.S. Cl.
CPC ........... *G09G 3/32* (2013.01); *G09G 2310/08* (2013.01); *G09G 2330/021* (2013.01); *G09G 2330/06* (2013.01)

(58) Field of Classification Search
CPC ................. G09G 3/32; G09G 2310/08; G09G 2330/021; G09G 2330/06; G09G 3/3208; G09G 3/006; G09G 2230/00; G09G 2300/026
See application file for complete search history.

(56) References Cited

U.S. PATENT DOCUMENTS

| | | | | |
|---|---|---|---|---|
| 11,132,938 B2 * | 9/2021 | Nam | G09G 3/3233 |
| 11,735,122 B2 * | 8/2023 | Kim | G09G 3/3275<br>345/204 |
| 2007/0063950 A1 * | 3/2007 | Shin | G11C 19/184<br>345/92 |
| 2007/0091018 A1 | 4/2007 | Park et al. | |
| 2009/0079359 A1 * | 3/2009 | Shteynberg | H05B 45/24<br>315/291 |
| 2017/0278451 A1 * | 9/2017 | Peng | G09G 3/2092 |
| 2018/0182288 A1 * | 6/2018 | Kim | G09G 3/3291 |

(Continued)

FOREIGN PATENT DOCUMENTS

| | | |
|---|---|---|
| KR | 10-2007-0044957 A | 5/2007 |
| KR | 10-2008-0049563 A | 6/2008 |

(Continued)

*Primary Examiner* — Andrew Sasinowski
(74) *Attorney, Agent, or Firm* — Morgan, Lewis & Bockius LLP

(57) ABSTRACT

The present disclosure relates to a display driving device, a display device, and a display driving method. The display driving device may include a control circuit configured to control a driving circuit configured to drive pixels of a display panel, a power circuit configured to supply power to the driving circuit and the control circuit in response to an input voltage, a sensing circuit configured to sense a peak current on a power path through which the input voltage is applied, and a power control circuit configured to increase time intervals between power activation signals input to the power circuit. Therefore, it is possible to reduce electromagnetic interference (EMI) and minimize an increase in noise caused to overlapping noises.

17 Claims, 32 Drawing Sheets

(56) References Cited

U.S. PATENT DOCUMENTS

| | | | | |
|---|---|---|---|---|
| 2022/0301496 | A1* | 9/2022 | Park | G11C 19/28 |
| 2023/0186831 | A1 | 6/2023 | Pyun et al. | |
| 2023/0206860 | A1* | 6/2023 | Lee | G09G 3/3233 |

FOREIGN PATENT DOCUMENTS

| | | | |
|---|---|---|---|
| KR | 10-2018-0077412 | A | 7/2018 |
| KR | 10-2023-0090417 | A | 6/2023 |

* cited by examiner

FIG. 26

| ITEMS | TIME INTERVAL BETWEEN POWER CIRCUIT ACTIVATION SIGNALS(μs) | | | | | | | | Gain |
|---|---|---|---|---|---|---|---|---|---|
| | DRIVING DEVICE1 | DRIVING DEVICE2 | DRIVING DEVICE3 | DRIVING DEVICE4 | DRIVING DEVICE5 | DRIVING DEVICE6 | DRIVING DEVICE7 | DRIVING DEVICE8 | |
| COMPARATIVE EXAMPLE | 0 | 0 | 0 | 0 | 0 | 0 | 0 | 0 | −17.8 |
| EXAMPLE1 | 0 | 0 | ~0.4 | ~0.4 | 0 | 0 | ~0.4 | ~0.4 | −17.8 |
| EXAMPLE2 | 0 | 0 | 0.5 | 0.5 | 0 | 0 | 0.5 | 0.5 | −20.6 |
| EXAMPLE3 | 0 | 0 | 1.5 | 1.5 | 0 | 0 | 1.5 | 1.5 | −21.5 |
| EXAMPLE4 | 0 | 0 | 2 | 2 | 0 | 0 | 2 | 2 | −17.8 |
| EXAMPLE5 | 1.5 | 1.5 | 1 | 1 | 0 | 0 | 0.5 | 0.5 | −22 |

DISPLAY DRIVING DEVICE AND DISPLAY DEVICE INCLUDING THE SAME

CROSS-REFERENCE TO RELATED APPLICATION

This application claims priority to and the benefit of Korean Patent Application No. 10-2023-0173180, filed on Dec. 4, 2023, the disclosure of which is incorporated herein by reference in its entirety.

BACKGROUND

1. Field

The present disclosure relates to a display driving device and a display device including the same.

2. Discussion of Related Art

Display devices are devices for displaying one or more images on one screen. A display device may include a plurality of display panels and perform a multi-display function capable of displaying images on a plurality of screens. Examples of such multi-display systems include tiling display devices or video wall systems in which a plurality of display panels are coupled to form a large screen.

A multi-display system may include an external power supply device for supplying power to a plurality of display modules and a display driving device for driving the plurality of display modules. When a signal generated by the external power supply device is transmitted to a plurality of display driving devices, a peak of a specific physical property is generated, thereby causing electro-magnetic interference (EMI).

Recently, the EMI regulations for home appliances and communication devices are being tightened. In the case of display devices, various EMI reduction technologies are being applied to meet the EMI standards.

SUMMARY

Accordingly, the present disclosure is directed to a display driving device and a display device including the same that substantially obviate one or more of the problems due to limitations and disadvantages of the related art.

The objects of the present disclosure are not limited to the above-described objects, and other objects that are not mentioned can be clearly understood by those skilled in the art from the following description.

To achieve these objects and other advantages of the present disclosure, as embodied and broadly described herein, a display driving device includes a first power circuit configured to supply power to a first driving circuit configured to drive pixels of a first display panel and a first control circuit configured to control the first driving circuit upon receiving a first power activation signal and, a second power circuit configured to supply power to a second driving circuit configured to drive pixels of a second display panel and a second control circuit configured to control the second driving circuit upon receiving a second power activation signal, a first sensing circuit disposed between a main power supply circuit and the first power circuit and configured to sense a first current input to the first power circuit, a second sensing circuit disposed between the main power supply circuit and the second power circuit and configured to sense a second current input to the second power circuit, and a power control circuit configured to increase a time interval between the first power activation signal and the second power activation signal when at least one of the first current and the second current is greater than or equal to a preset threshold.

In another aspect of the present disclosure, a display device includes a plurality of display panels, a plurality of power circuits configured to supply power to a plurality of driving circuits configured to respectively drive pixels of the plurality of display panels, and a plurality of control circuits configured to respectively control the plurality of driving circuits, a plurality of sensing circuits disposed between the main power supply circuit and the plurality of power circuits and each configured to sense a current input to one of the plurality of power circuits, and a power control circuit configured to increase at least one of time intervals between a plurality of power activation signals input to the plurality of power circuits when at least one of the plurality of currents is greater than or equal to a preset threshold, wherein the plurality of power circuits receive the plurality of power activation signals, respectively, and supply power to the plurality of driving circuits and the plurality of control circuits.

In yet another aspect of the present disclosure, a display device includes an external power supply device including a main power supply circuit configured to output a voltage, and a display driving device operated by receiving the voltage from the external power supply device, wherein the display driving device includes a first power circuit configured to supply power to a first driving circuit configured to drive pixels of a first display panel and a first control circuit configured to control the first driving circuit upon receiving a first power activation signal and, and a second power circuit configured to supply power to a second driving circuit configured to drive pixels of a second display panel and a second control circuit configured to control the second driving upon receiving a second power activation signal, and the external power supply device includes a first sensing circuit disposed between the main power supply circuit and the first power circuit and configured to sense a first current input to the first power circuit, a second sensing circuit disposed between the main power supply circuit and the second power circuit and configured to sense a second current input to the second power circuit, and a power control circuit configured to increase a time interval between the first power activation signal and the second power activation signal when at least one of the first current and the second current is greater than or equal to a preset threshold.

Additional features and aspects of the present disclosure will be set forth in the description that follows and in part will become apparent from the description or may be learned by practice of the inventive concepts provided herein. Other features and aspects of the inventive concepts may be realized and attained by the structure particularly pointed out in, or derivable from, the written description, claims hereof, and the appended drawings.

It is to be understood that both the foregoing general description and the following detailed description of the present disclosure are by way of example and are intended to provide further explanation of the disclosures.

BRIEF DESCRIPTION OF THE DRAWINGS

The accompanying drawings, which are included to provide a further understanding of the disclosure and are incorporated in and constitute a part of this application, illustrate example embodiments of the disclosure and together with the description serve to explain the principles of the disclosure.

FIG. 26 is a simulation result table for determining an optimal time interval numerical range of the power activation signals.

DETAILED DESCRIPTION

Figure 1:
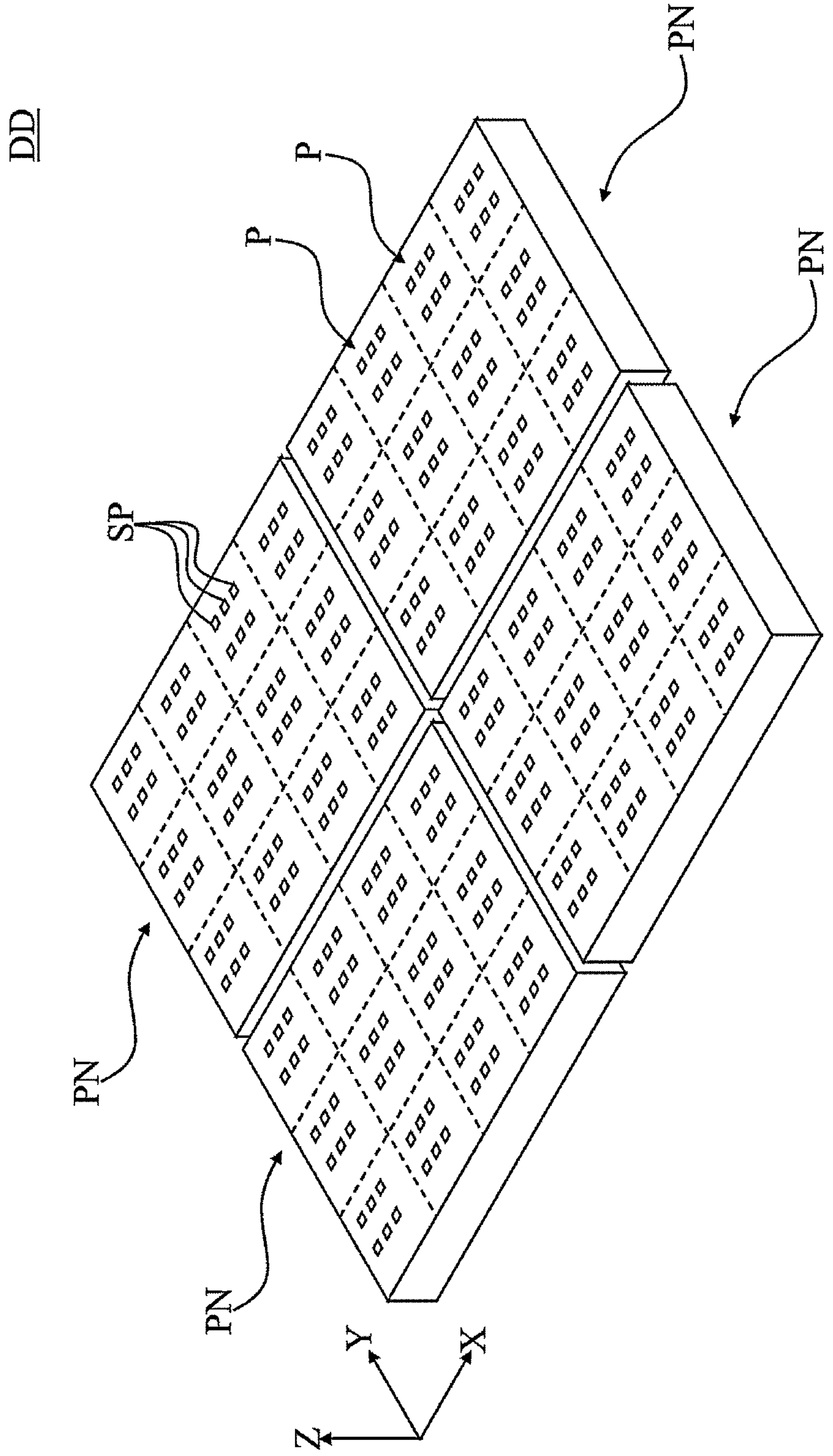
FIG. 1 is a schematic perspective view of a display device according to an example embodiment of the present disclosure.

Advantages and features of the present disclosure and methods of achieving them will become apparent with reference to the example embodiments described below in detail in conjunction with the accompanying drawings. The present disclosure may, however, be embodied in different forms and should not be construed as limited to the example embodiments set forth herein. Rather, these example embodiments are provided so that this disclosure will be thorough and complete and will fully convey the scope of the present disclosure to those skilled in the art.

In the following description, where a detailed description of a relevant known function or configuration may unnecessarily obscure aspects of the present disclosure, a detailed description of such a known function or configuration may be omitted or be briefly discussed.

Where a term like "comprise," "have," "include," "contain," or "consist of" is used, one or more other elements may be added unless the term is used with a more limiting term, such as "only" or the like. An element described in a singular form may include a plurality of elements, and vice versa, unless the context clearly indicates otherwise.

Where a positional relationship between two elements is described with such a term as "on," "above," "under," "next to," "connected," "coupled," "crossing," "intersecting," or the like, one or more other elements may be located between the two elements unless the term is used with a more limiting term, such as "immediate(ly)" or "direct(ly)."

Where a temporal relationship is described using such a term as "after," "subsequently," "then," "before," or the like, it may include a non-consecutive case unless it is used with a more limiting term like "immediately" or "directly."

Although terms "first," "second," and the like may be used herein to describe various elements, these elements should not be interpreted to be limited by these terms as they are not used to define a particular essence, order, sequence, precedence, or number of such elements. These terms are used only to refer one element separately from another. For example, a first element could be termed a second element, and a second element could similarly be termed a first element, without departing from the scope of the present disclosure.

Features of various embodiments of the present disclosure may be partially or wholly coupled to or combined with each other, and may be operated, linked, or driven together in various ways as those skilled in the art can sufficiently understand. The embodiments of the present disclosure may be carried out independently from each other, or may be carried out together in association with each other.

In addition, terms (including technical and scientific terms) used in embodiments of the present disclosure may be construed as meaning that may be generally understood by those skilled in the art to which the present disclosure pertains unless explicitly specifically defined and described, and the meanings of the commonly used terms, such as terms defined in a dictionary, may be construed in consideration of contextual meanings of related technologies.

Hereinafter, various example embodiments of the present disclosure will be described in detail with reference to the accompanying drawings.

FIG. 1 is a schematic perspective view of a display device according to an example embodiment of the present disclosure.

As shown in FIG. 1, a display device DD according to an example embodiment of the present disclosure may include a plurality of display panels PN disposed on an XY plane. Each of the display panels PN may reproduce input images. The display device DD may be coupled in a unit of a display panel PN. In the drawing, for convenience of description, four display panels PN are shown as being coupled, but by applying the same, additional display panels extending in an X-axis direction and/or a Y-axis direction may be coupled to form a large-screen display device DD. The display device DD may have a honeycomb structure or a delta structure.

One or more pixels P may be disposed on the display panel PN. The pixels P may be disposed along a plurality of row lines and a plurality of column lines. The pixel P may include a plurality of sub-pixels SP for emitting light with different colors. The sub-pixel SP may include a light emitting element and a pixel circuit and emit light independently by power supplied from the outside. The sub-pixel SP may be any one selected from the group consisting of a red sub-pixel, a blue sub-pixel, and a green sub-pixel, but is not limited thereto. The light emitting element may be an organic light emitting diode (OLED) or an inorganic light emitting diode (e.g., a micro light emitting diode (LED) or a nano-scale LED).

Figure 2:
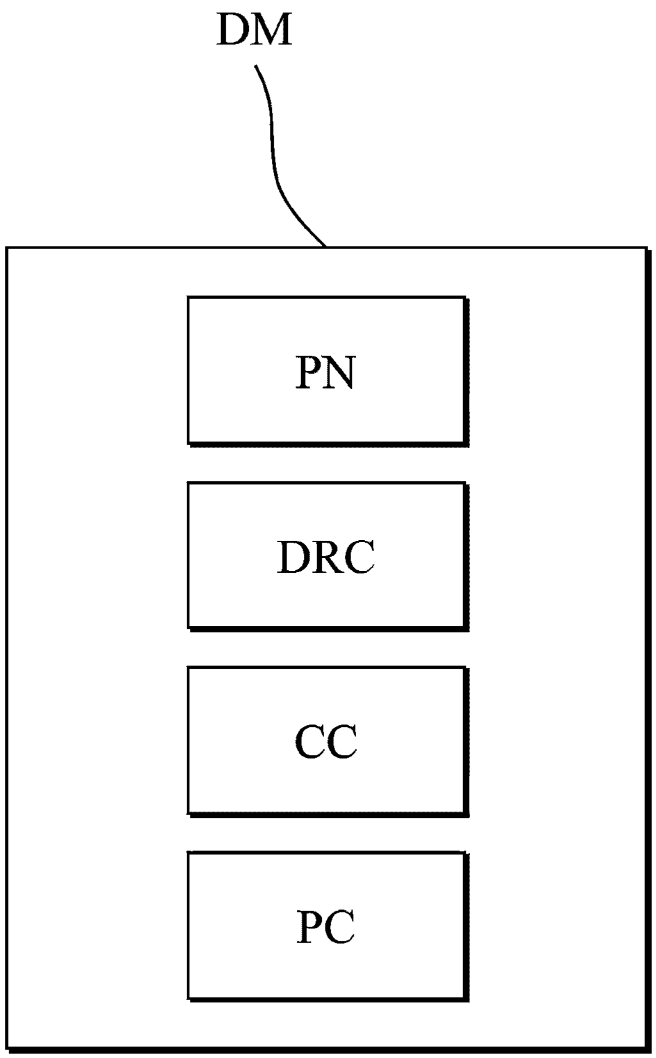
FIG. 2 is a schematic view showing a display module according to an example embodiment of the present disclosure.
Figure 3:
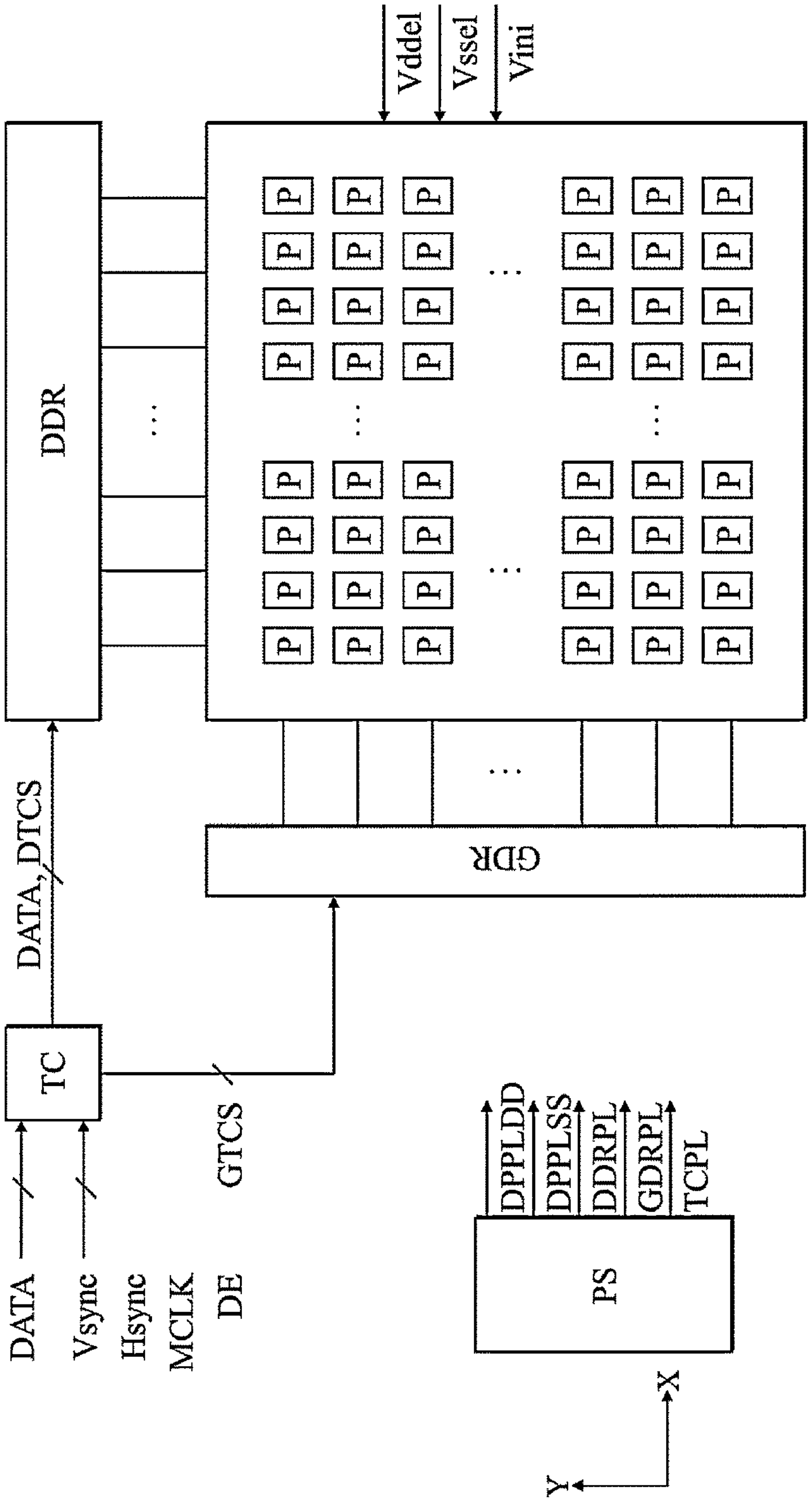
FIG. 3 is a detailed view showing the display module according to an example embodiment of the present disclosure.

FIG. 2 is a schematic view showing a display module according to an example embodiment of the present disclosure. FIG. 3 is a detailed view showing the display module according to an example embodiment of the present specification.

As shown in FIGS. 2 and 3, a display module DM may include a display panel PN on which pixels are disposed, a driving circuit DRC for driving the pixels P of the display panel PN, a control circuit CC for controlling the driving circuit DRC, and a power circuit PC for supplying power to the pixels P disposed on the display panel PN, the driving circuit DRC, and the control circuit CC. The driving circuit DRC may include a data driver DDR, a gate driver GDR, and a pixel circuit embedded in each of the pixels P. The control circuit CC may include a level shifter (not shown) and a timing controller TC. The power circuit PC may include a power supply PS.

Each of the pixels P of the display panel PN may receive a data voltage supplied from the data driver DDR, a gate signal supplied from the gate driver GDR, a high potential voltage Vddel and low potential voltage Vssel supplied from the power supply PS, and the like and display input images. The display panel PN may receive an initialization voltage Vini in addition to the high potential voltage Vddel and the low potential voltage Vssel. The initialization voltage Vini may be supplied from the power supply PS or the data driver DDR. Each of the pixels P may include a plurality of sub-pixels for emitting light with different colors for color implementation. Each of the sub-pixels may include a light emitting element for emitting light with a brightness corresponding to pixel data of the input image, and a pixel circuit for driving the light emitting element. The pixel circuit may include a pixel driver.

The level shifter may generate and output a plurality of clock signals based on signals output from the timing controller TC. The plurality of clock signals may be generated and output in the form of an N-phase with a different phase, such as 2-phase, 4-phase, or 8-phase (N is an integer of 2 or more).

The timing controller TC may receive pixel data DATA of the input images and timing signals Hsync, Vsync, MCLK, and DE synchronized with the pixel data DATA from an external host system. The timing signals may include the data enable signal DE, the vertical synchronization signal Vsync, the horizontal synchronization signal Hsync, the dot clock signal MCLK, and the like, but are not limited thereto. The timing controller TC may output a gate timing control signal GTCS for controlling the operation timing of the gate driver GDR, a data timing control signal DTCS for controlling the operation timing of the data driver DDR, and the like based on the timing signals. The timing controller TC may be mounted on a board of the display driving device in the form of an integrated circuit (IC).

The data driver DDR may sample and latch the pixel data DATA received as digital signals from the timing controller TC using a clock of the data timing control signal DTCS and convert a series signal system of an input signal including the pixel data into a parallel signal system. Subsequently, the data driver DDR may convert the latched data into a gamma compensation voltage for each grayscale and output the data voltage of the pixel data. The data driver DDR can be implemented in the form of the IC and electrically connected to data lines of a display module.

The gate driver GDR may output a gate signal and the like in response to the gate timing control signal GTCS. The gate driver GDR may output the gate signal and the like through gate lines. The gate driver GDR may be formed in the form of the IC or formed on the display panel (PN) using a gate in panel method (a method of forming a transistor on a substrate using a thin film process). The gate driver GDR may include a plurality of transistors and a capacitor. The gate driver GDR may be disposed in a non-display area of the display panel PN. Alternatively, at least some of the gate drivers GDR may be disposed in a display area of the display panel PN.

The power supply PS may be electrically connected to the display panel PN through a first power line DPPLDD and a second power line DPPLSS. The power supply PS may output the high potential voltage Vddel, the low potential voltage Vssel, and the like. Each of the high potential voltage Vddel and low potential voltage Vssel output from the power supply PS may be supplied to the display panel PN through the first power line DPPLDD and the second power line DPPLSS. The power supply PS may be formed in the form of the IC.

The power supply PS may be electrically connected to the above-described pixel circuit through the first and second power lines DPPLDD and DPPLSS. The power supply PS may be electrically connected to the data driver DDR through a third power line DDRPL. The power supply PS may be electrically connected to the gate driver GDR through a fourth power line GDRPL. The power supply PS may be electrically connected to the timing controller TC through a fifth power line TCPL.

The display driving device according to an example embodiment of the present disclosure may include a driving circuit, a control circuit, a power circuit, and the like for driving the display device, and these circuits may be mounted on the board in the display driving device in the form of the IC. However, it is illustrative, and at least some components of the display driving device may be integrated into the display panel PN.

Figure 4:
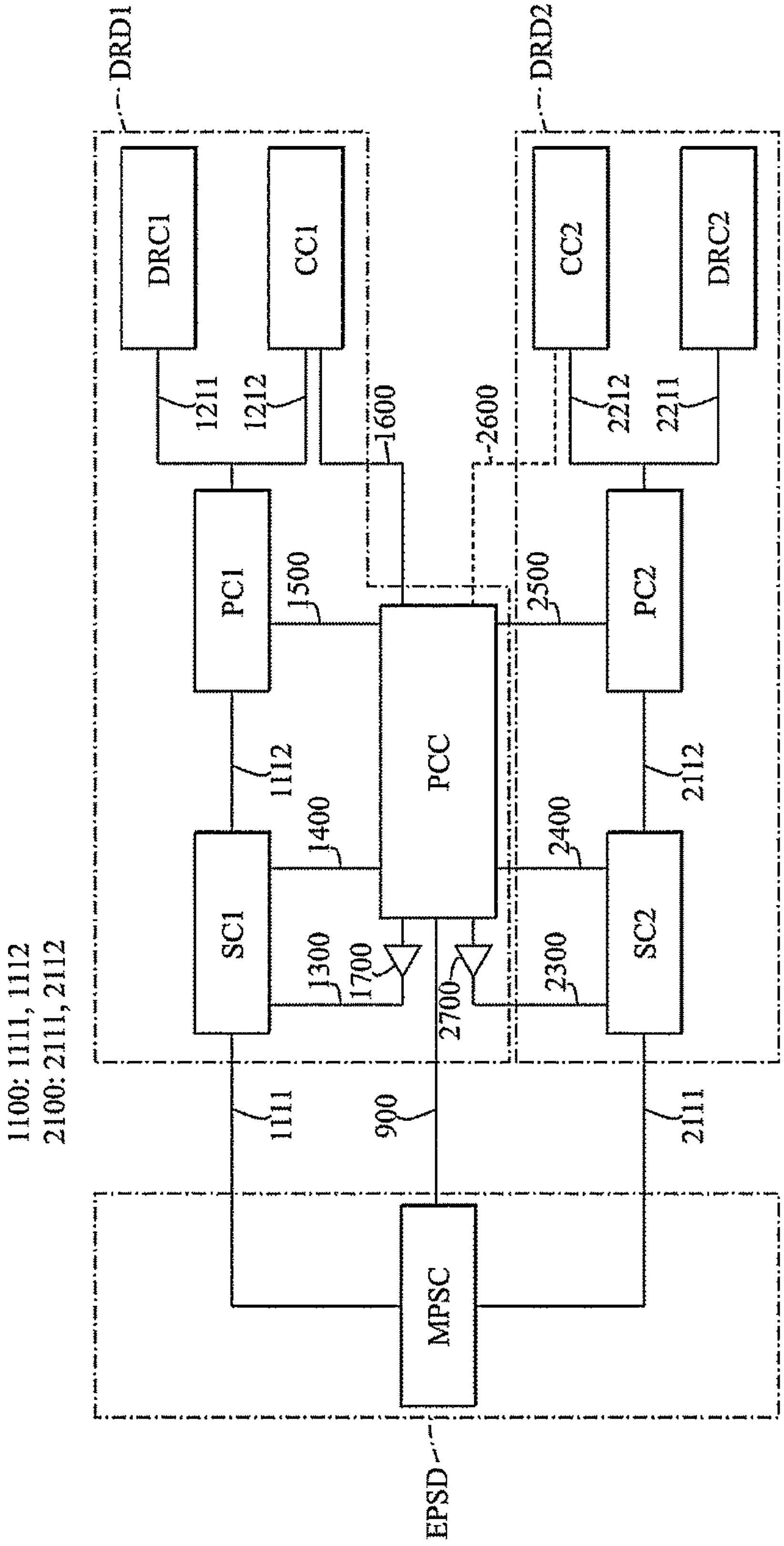
FIG. 4 is a view showing a configuration and connection relationship of a display device according to a first example embodiment of the present disclosure.
Figure 5:
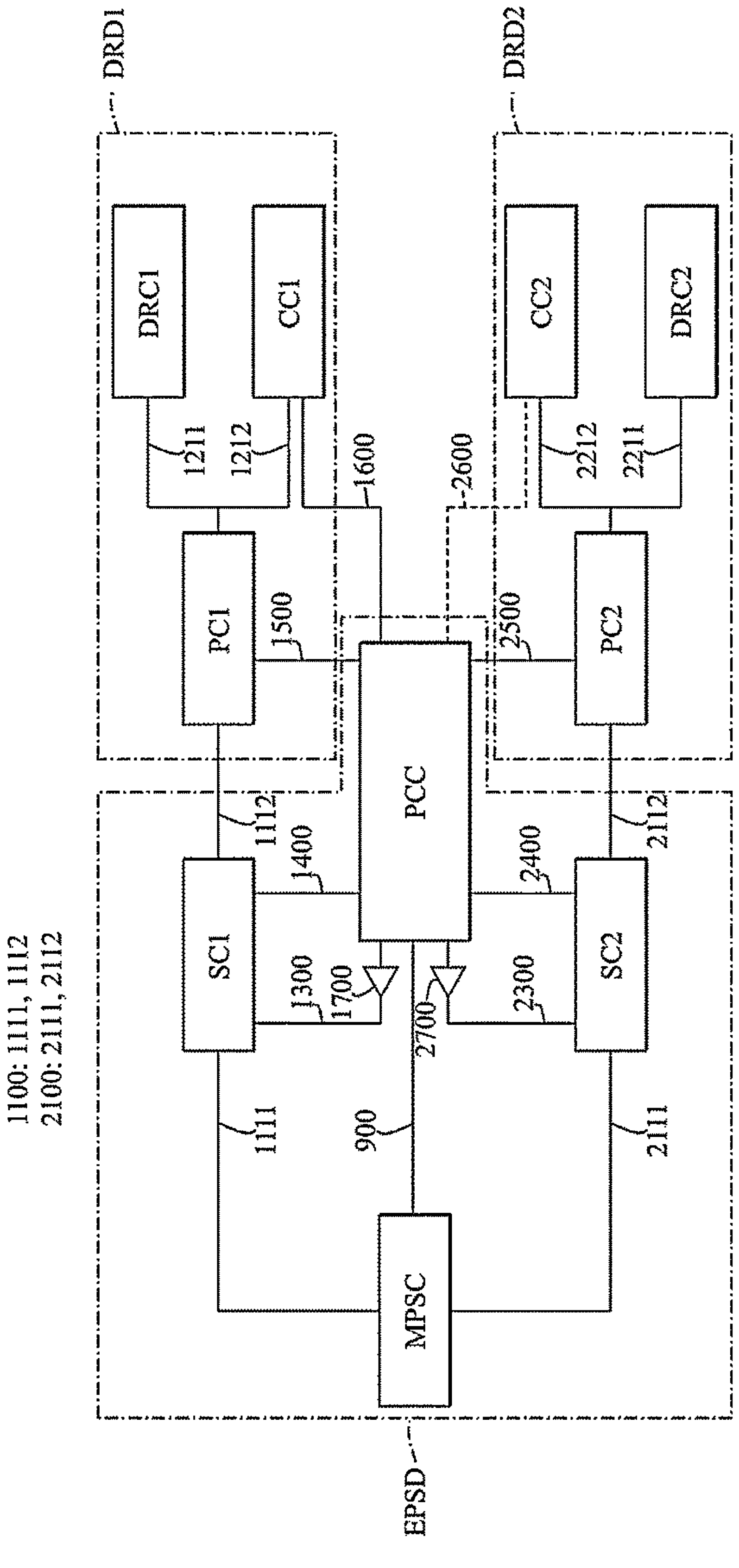
FIG. 5 is a view showing a configuration and connection relationship of a display device according to a second example embodiment of the present disclosure.
Figure 6:
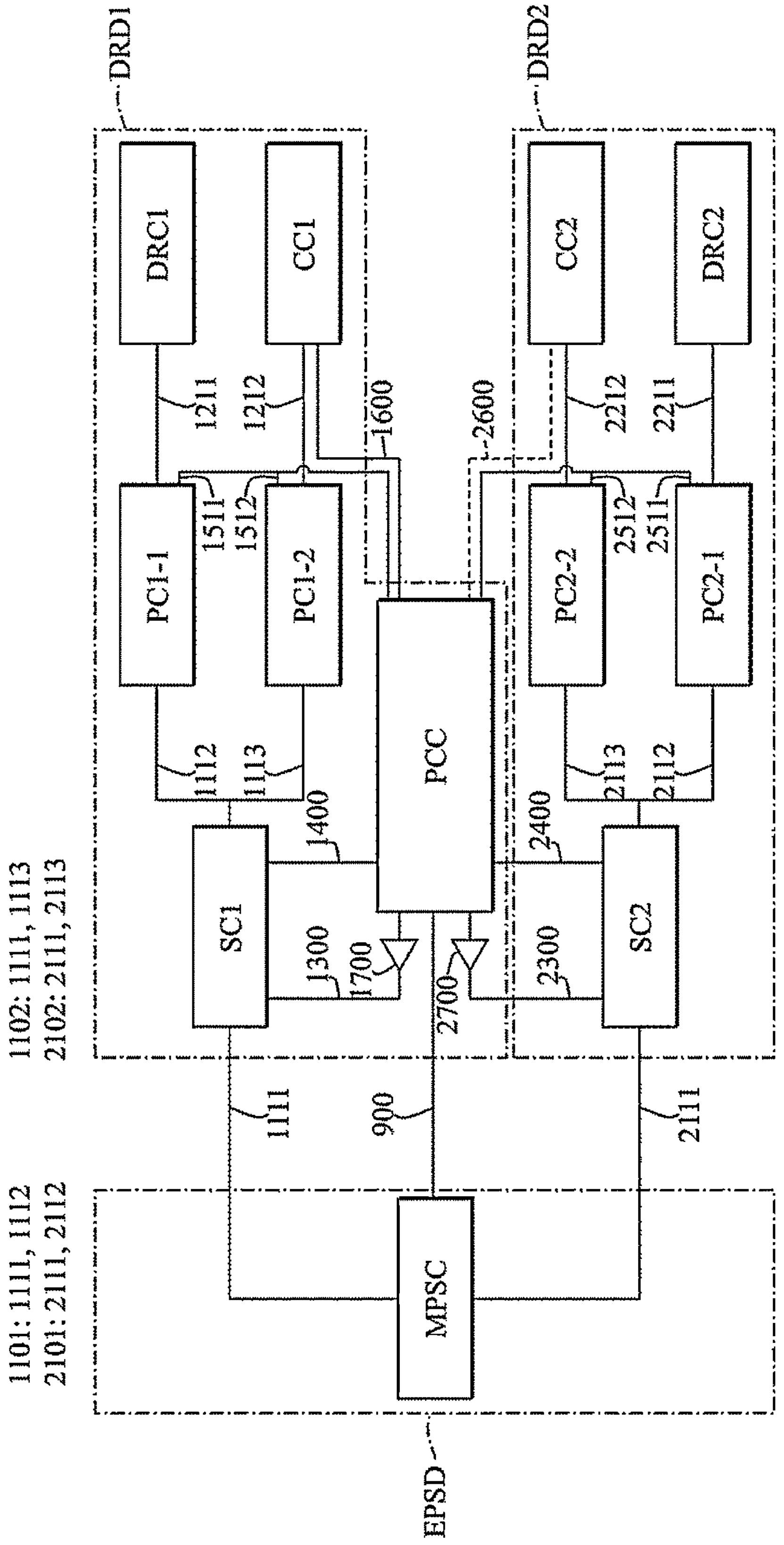
FIG. 6 is a view showing a configuration and connection relationship of a display device according to a third example embodiment of the present disclosure.
Figure 7:
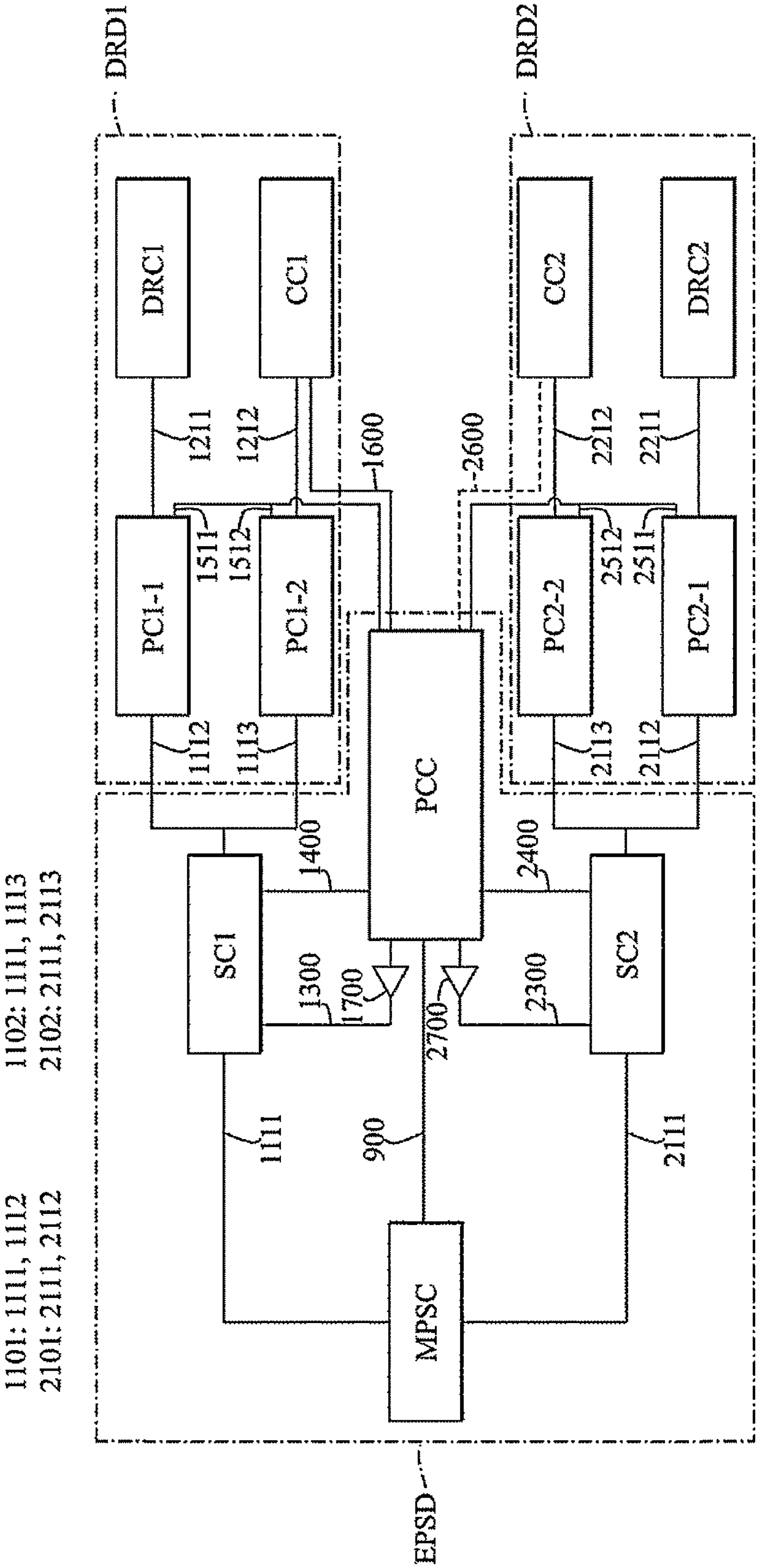
FIG. 7 is a view showing a configuration and connection relationship of a display device according to a fourth example embodiment of the present disclosure.

FIG. 4 is a view showing a configuration and connection relationship of a display device according to a first embodiment of the present disclosure. FIG. 5 is a view showing a configuration and connection relationship of a display device according to a second embodiment of the present disclosure. FIG. 6 is a view showing a configuration and connection relationship of a display device according to a third embodiment of the present disclosure. FIG. 7 is a view showing a configuration and connection relationship of a display device according to a fourth embodiment of the present disclosure. Components that perform substantially the same function between embodiments are denoted by the same reference numerals, and overlapping descriptions thereof will be omitted.

As shown in FIG. 4, in an example embodiment, the display device may include a first display driving device DRD1 and a second display driving device DRD2. The display device may further include an external power supply device EPSD. The first display driving device DRD1 and the second display driving device DRD2 may drive a first display module and a second display module, respectively.

The external power supply device EPSD may include a main power supply circuit MPSC.

The first display driving device DRD1 may include a first driving circuit DRC1 for driving pixels of the first display panel provided in the first display module, a first control circuit CC1 for controlling the first driving circuit DRC1, a first power circuit PC1 for supplying power to the first driving circuit DRC1 and the first control circuit CC1, a first sensing circuit SC1 for sensing a voltage and/or a current, and the like. The first display driving device DRD1 may further include a power control circuit PCC for generating a first power activation signal. The first power activation signal may be supplied from the power control circuit PCC to the first power circuit PC1 to activate the generation of a first pulse width modulation (PWM) signal in the first power circuit PC1. The first PWM signal can suppress the fluctuation of a constant voltage level output from the first power circuit PC1.

The first driving circuit DRC1 may include the above-described data driver and gate driver. The first control circuit may include the above-described timing controller.

The first power circuit PC1 may be electrically connected to the main power supply circuit MPSC by first power cables 1111 and 1112. The first power circuit PC1 may be electrically connected to the first driving circuit DRC1 by a 1-1 wire 1211. The first power circuit PC1 may be electrically connected to the first control circuit CC1 by a 1-2 wire 1212.

The first power cables 1111 and 1112 may serve as a first power path 1100 that is a path through which a first input voltage may be applied from the main power supply circuit MPSC to the first power circuit PC1.

The first sensing circuit SC1 may be disposed on the first power cables 1111 and 1112. The first sensing circuit SC1 may be electrically connected to the main power supply circuit MPSC by the 1-1 power cable 1111. The first sensing circuit SC1 may be electrically connected to the first power circuit PC1 by the 1-2 power cable 1112.

The power control circuit PCC may be electrically connected to the main power supply circuit MPSC by a power cable 900. The power control circuit PCC may be electrically connected to the first sensing circuit SC1 by a first sensing cable 1400 and a first transmission cable 1300. The power control circuit PCC may be electrically connected to the first power circuit PC1 by a first activation cable 1500. The power control circuit PCC may be electrically connected to the first control circuit CC1 by a first timing cable 1600.

The first transmission cable 1300 may include an analog-digital converter (ADC) 1700.

The second display driving device DRD2 may include a second driving circuit DRC2 for driving pixels of the second display panel provided in the second display module, a second control circuit CC2 for controlling the second driving circuit DRC2, a second power circuit PC2 for supplying power to the second driving circuit DRC2 and the second control circuit CC2, a second sensing circuit SC2 for sensing a voltage and/or a current, and the like. The second display driving device DRD2 may further include the power control circuit PCC for generating a second power activation signal. The second power activation signal may be supplied from the power control circuit PCC to the second power circuit PC2 to activate the generation of a second PWM signal in the second power circuit PC2. The second PWM signal can suppress the fluctuation of a constant voltage level output from the second power circuit PC2.

The second driving circuit DRC2 may include the above-described data driver and gate driver. The second control circuit CC2 may include the above-described timing controller.

The second power circuit PC2 may be electrically connected to the main power supply circuit MPSC by second power cables 2111 and 2112. The second power circuit PC2 may be electrically connected to the second driving circuit DRC2 by a 2-1 wire 2211. The second power circuit PC2 may be electrically connected to the second control circuit CC2 by a 2-2 wire 2212.

The second power cables 2111 and 2112 may serve as a second power path 2100 that is a path through which a second input voltage may be applied from the main power supply circuit MPSC to the second power circuit PC2.

The second sensing circuit SC2 may be disposed on the second power cables 2111 and 2112. The second sensing circuit SC2 may be electrically connected to the main power supply circuit MPSC by a 2-1 power cable 2111. The second sensing circuit SC2 may be electrically connected to the second power circuit PC2 by a 2-2 power cable 2112.

The power control circuit PCC may be electrically connected to the second sensing circuit SC2 by a second sensing cable 2400 and a second transmission cable 2300. The power control circuit PCC may be electrically connected to the second power circuit PC2 by a second activation cable 2500. The power control circuit PCC may be electrically connected to the first control circuit CC1 by a first timing cable 1600 or may be electrically connected to the second control circuit CC2 by a second timing cable 2600. As shown, the power control circuit PCC is electrically connected to the first control circuit CC1. The power control circuit PCC may be connected to the first control circuit CC1 by the first timing cable 1600 to receive a timing signal synchronized with the image signal. Since it is sufficient that the power control circuit PCC receives the timing signal synchronized with the image signal, the power control circuit PCC may be only connected to at least one of the first control circuit CC1 and the second control circuit CC2.

The second transmission cable 2300 may include a second analog-to-digital converter 2700.

As shown in FIG. 5, in an example embodiment, the display device may include the first display driving device DRD1 and the second display driving device DRD2. The display device may further include the external power supply device EPSD. The first display driving device DRD1 and the second display driving device DRD2 may drive the first display module and the second display module, respectively.

The external power supply device EPSD may include the main power supply circuit MPSC and first and second sensing circuits SC1 and SC2 for sensing a voltage and/or a current. The external power supply device EPSD may further include the power control circuit PCC for generating the above-described first and second power activation signals.

The first display driving device DRD1 may include the first driving circuit DRC1 for driving the pixels of the first display panel provided in the first display module, the first control circuit CC1 for controlling the first driving circuit DRC1, the first power circuit PC1 for supplying power to the first driving circuit DRC1 and the first control circuit CC1, and the like.

The second display driving device DRD2 may include the second driving circuit DRC2 for driving the pixels of the second display panel provided in the second display module, the second control circuit CC2 for controlling the second driving circuit DRC2, the second power circuit PC2 for supplying power to the second driving circuit DRC2 and the second control circuit CC2, and the like.

As shown in FIG. 6, in an example embodiment, the display device may include the first display driving device DRD1 and the second display driving device DRD2. The display device may further include the external power supply device EPSD. The first display driving device DRD1 and the second display driving device DRD2 may drive the first display module and the second display module, respectively.

The external power supply device EPSD may include the main power supply circuit MPSC.

The first display driving device DRD1 may include the first driving circuit DRC1 for driving the pixels of the first display panel provided in the first display module, the first control circuit CC1 for controlling the first driving circuit DRC1, a 1-1 power circuit PC1-1 for supplying power to the first driving circuit DRC1, a 1-2 power circuit PC1-2 for supplying power to the first control circuit CC1, the first sensing circuit SC1 for sensing a voltage and/or a current, and the like. The first display driving device DRD1 may further include the power control circuit PCC for generating a 1-1 power activation signal and a 1-2 power activation signal. The 1-1 power activation signal may be supplied from the power control circuit PCC to the 1-1 power circuit PC1-1 to activate the generation of a 1-1 PWM signal in the 1-1 power circuit PC1-1. The 1-1 PWM signal can suppress the fluctuation of a constant voltage level output from the 1-1 power circuit PC1-1. The 1-2 power activation signal may be supplied from the power control circuit PCC to the 1-2 power circuit PC1-2 to activate the generation of a 1-2 PWM signal in the 1-2 power circuit PC1-2. The 1-2 PWM signal can suppress the fluctuation of a constant voltage level output from the 1-2 power circuit PC1-2.

The 1-1 power circuit PC1-1 may be electrically connected to the main power supply circuit MPSC by 1-1 and 1-2 power cables 1111 and 1112. The 1-1 power circuit PC1-1 may be electrically connected to the first driving circuit DRC1 by a 1-1 wire 1211.

The 1-2 power circuit PC1-2 may be electrically connected to the main power supply circuit MPSC by 1-1 and 1-3 power cables 1111 and 1113. The 1-2 power circuit PC1-2 may be electrically connected to the first control circuit CC1 by a 1-2 wire 1212.

The 1-1 and 1-2 power cables 1111 and 1112 may serve as a 1-1 power path 1101 that is a path through which a 1-1 input voltage may be applied from the main power supply circuit MPSC to the 1-1 power circuit PC1-1.

The 1-1 and 1-3 power cables 1111 and 1113 may serve as a 1-2 power path 1102 that is a path through which a 1-2 input voltage may be applied from the main power supply circuit MPSC to the 1-2 power circuit PC1-2.

The first sensing circuit SC1 may be disposed on the 1-1 power cable 1111. The first sensing circuit SC1 may be electrically connected to the main power supply circuit MPSC by the 1-1 power cable 1111. The first sensing circuit SC1 may be electrically connected to the 1-1 power circuit PC1-1 by the 1-2 power cable 1112. The first sensing circuit SC1 may be electrically connected to the 1-2 power circuit PC1-2 by the 1-3 power cable 1113.

Although not shown in the drawing, the present disclosure is not limited thereto, and the first sensing circuit may not be disposed on the 1-1 power cable. The first sensing circuit SC1 may include a 1-1 sensing circuit disposed on the 1-2 power cable 1112 and a 1-2 sensing circuit disposed on the 1-3 power cable 1113.

The 1-1 sensing circuit may be electrically connected to the main power supply circuit MPSC by the 1-1 power cable 1111. The 1-1 sensing circuit may be electrically connected to the 1-1 power circuit PC1-1 by the 1-2 power cable 1112.

The 1-2 sensing circuit may be electrically connected to the main power supply circuit MPSC by the 1-1 power cable 1111. The 1-2 sensing circuit may be electrically connected to the 1-2 power circuit PC1-2 by the 1-3 power cable 1113.

The power control circuit PCC may be electrically connected to the 1-1 power circuit PC1-1 by a 1-1 activation cable 1511. The power control circuit PCC may be electrically connected to the 1-2 power circuit PC1-2 by a 1-2 activation cable 1512.

The second display driving device DRD2 may include the second driving circuit DRC2 for driving the pixels of the second display panel provided in the second display module, the second control circuit CC2 for controlling the second driving circuit DRC2, a 2-1 power circuit PC2-1 for supplying power to the second driving circuit DRC2, a 2-2 power circuit PC2-2 for supplying power to the second control circuit CC2, the second sensing circuit SC2 for sensing a voltage and/or a current, and the like. The second display driving device DRD2 may further include the power control circuit PCC for generating a 2-1 power activation signal and a 2-2 power activation signal (not shown). The power control circuit PCC may be included in any one of the first display driving device DRD1 and the second display driving device DRD2. For example, in an example embodiment, the second display driving device DRD2 may include the power control circuit PCC, and the power control circuit PCC may be electrically connected to the first control circuit CC1 provided in the first display driving device DRD1 to receive a timing signal synchronized with the image signal. The 2-1 power activation signal may be supplied from the power control circuit PCC to the 2-1 power circuit PC2-1 to activate the generation of a 2-1 PWM signal in the 2-1 power circuit PC2-1. The 2-1 PWM signal can suppress the fluctuation of a constant voltage level output from the 2-1 power circuit PC2-1. The 2-2 power activation signal may be supplied from the power control circuit PCC to the 2-2 power circuit PC2-2 to activate the generation of a 2-2 PWM signal in the 2-2 power circuit PC2-2. The 2-2 PWM signal can suppress the fluctuation of a constant voltage level output from the 2-2 power circuit PC2-2.

The 2-1 power circuit PC2-1 may be electrically connected to the main power supply circuit MPSC by 2-1 and 2-2 power cables 2111 and 2112. The 2-1 power circuit PC2-1 may be electrically connected to the second driving circuit DRC2 by a 2-1 wire 2211.

The 2-2 power circuit PC2-2 may be electrically connected to the main power supply circuit MPSC by 2-1 and 2-3 power cables 2111 and 2113. The 2-2 power circuit PC2-2 may be electrically connected to the second control circuit CC2 by a 2-2 wire 2212.

The 2-1 and 2-2 power cables 2111 and 2112 may serve as a 2-1 power path 2101 that is a path through which a 2-1 input voltage may be applied from the main power supply circuit MPSC to the 2-1 power circuit PC2-1.

The 2-1 and 2-3 power cables 2111 and 2113 may serve as a 2-2 power path 2102 that is a path through which a 2-2 input voltage may be applied from the main power supply circuit MPSC to the 2-2 power circuit PC2-2.

The second sensing circuit SC2 may be disposed on the 2-1 power cable 2111. The second sensing circuit SC2 may be electrically connected to the main power supply circuit MPSC by the 2-1 power cable 2111. The second sensing circuit SC2 may be electrically connected to the 2-1 power circuit PC2-1 by the 2-2 power cable 2112. The second sensing circuit SC2 may be electrically connected to the 2-2 power circuit PC2-2 by a 2-3 power cable 2113.

Although not shown in the drawing, the present disclosure is not limited thereto, and the second sensing circuit SC2 may include a 2-1 sensing circuit disposed on the 2-2 power cable 2112 and a 2-2 sensing circuit disposed on the 2-3 power cable 2113.

The 2-1 sensing circuit may be electrically connected to the main power supply circuit MPSC by the 2-1 power cable 2111. The 2-1 sensing circuit may be electrically connected to the 2-1 power circuit PC2-1 by the 2-2 power cable 2112.

The 2-2 sensing circuit may be electrically connected to the main power supply circuit MPSC by the 2-1 power cable 2111. The 2-2 sensing circuit may be electrically connected to the 2-2 power circuit PC2-2 by the 2-3 power cable 2113.

The power control circuit PCC may be electrically connected to the 2-1 power circuit PC2-1 by a 2-1 activation cable 2511. The power control circuit PCC may be electrically connected to the 2-2 power circuit PC2-2 by a 2-2 activation cable 2512.

As shown in FIG. 7, the display device may include the first display driving device DRD1 and the second display driving device DRD2. The display device may further include the external power supply device EPSD. The first display driving device DRD1 and the second display driving device DRD2 may drive the first display module and the second display module, respectively.

The external power supply device EPSD may include the main power supply circuit MPSC and first and second sensing circuits SC1 and SC2 for sensing a voltage and/or a current. The external power supply device EPSD may further include the power control circuit PCC for generating the above-described first and second power activation signals.

The first display driving device DRD1 may include the first driving circuit DRC1 for driving the pixels of the first display panel provided in the first display module, the first control circuit CC1 for controlling the first driving circuit DRC1, the 1-1 power circuit PC1-1 for supplying power to the first driving circuit DRC1, the 1-2 power circuit PC1-2 for supplying power to the first control circuit CC1, and the like.

The second display driving device DRD2 may include the second driving circuit DRC2 for driving the pixels of the second display panel provided in the second display module, the second control circuit CC2 for controlling the second driving circuit DRC2, the 2-1 power circuit PC2-1 for supplying power to the second driving circuit DRC2, the 2-2 power circuit PC2-2 for supplying power to the second control circuit CC2, and the like.

Figure 8:
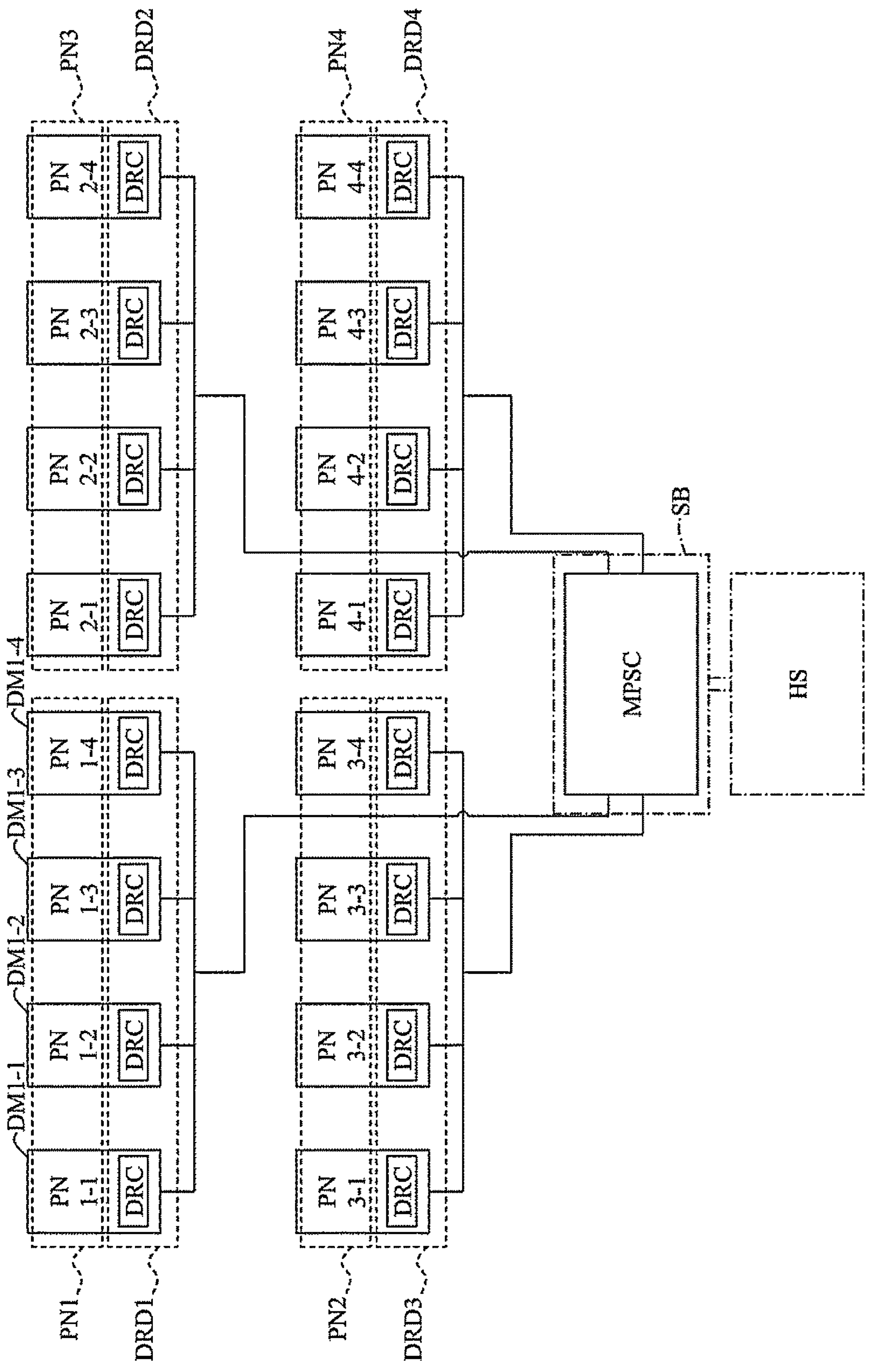
FIG. 8 is a view showing a configuration and connection relationship of a display device according to a fifth example embodiment of the present disclosure.
Figure 9:
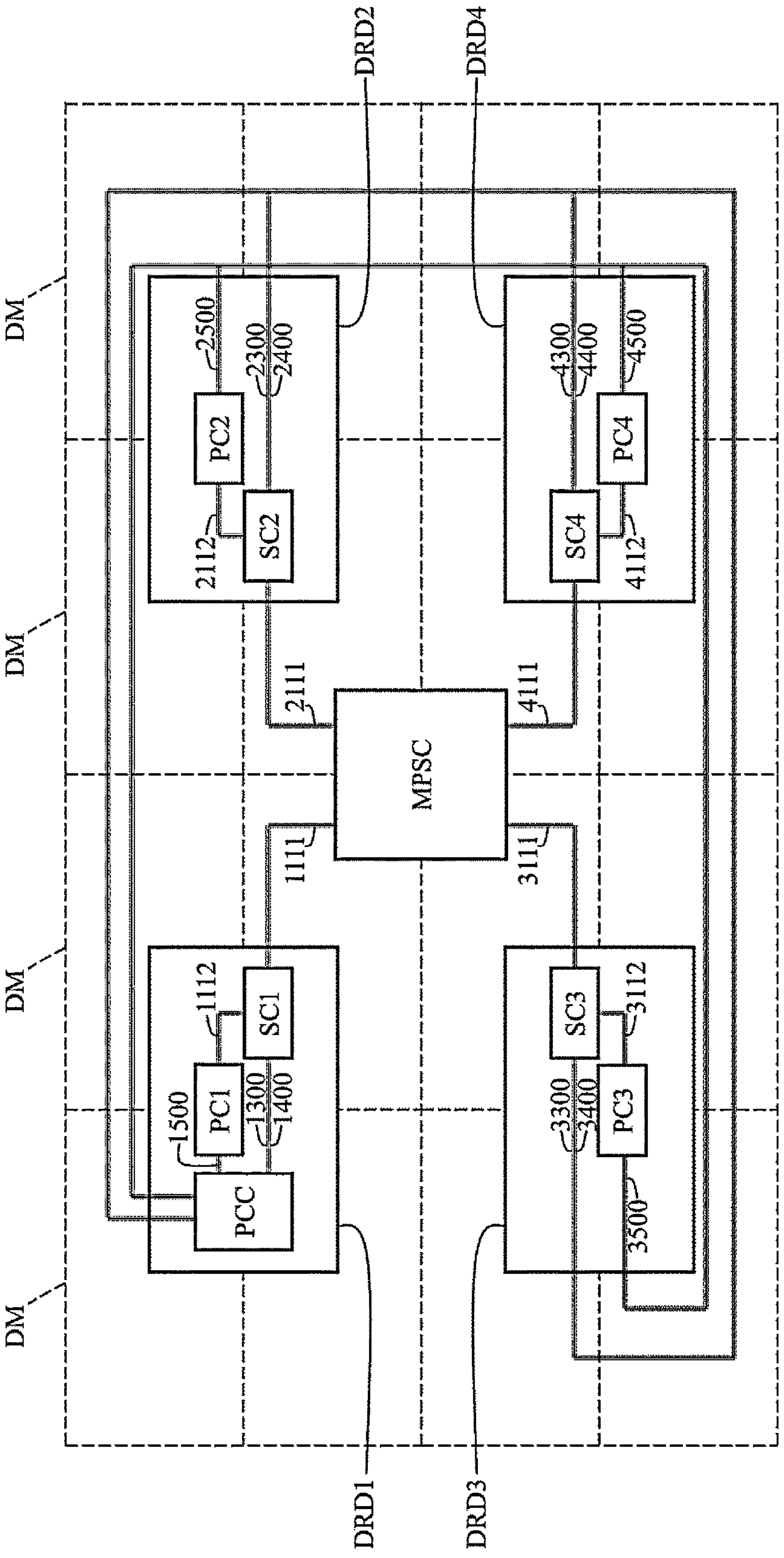
FIG. 9 is a schematic plan view showing the configuration and connection relationship of the display device according to the fifth example embodiment of the present disclosure.

FIG. 8 is a view showing a configuration and connection relationship of a display device according to a fifth embodiment of the present disclosure. FIG. 9 is a schematic plan view showing the configuration and connection relationship of the display device according to the fifth embodiment of the present disclosure. The display device of FIGS. 8 and 9 differ from that of FIGS. 4 to 7 in terms of the number of display driving devices and the number of display modules driven by one display driving device. Components that perform substantially the same function as the above-described embodiments are denoted by the same reference numerals, and overlapping descriptions thereof will be omitted.

As shown in FIGS. 8 and 9, each of the display modules (e.g., DM1-1, DM1-2, DM1-3, and DM1-4) may include display panels (e.g., PN1-1, PN1-2, PN1-3, and PN1-4) and display driving circuits DRC. Each of the display driving circuits DRC may be included in the display driving device (e.g., DRD1). The display driving device DRD1 may further include the power circuit (e.g., PC1), the sensing circuit (e.g., SC1), and/or the power control circuit PCC. The display driving device (e.g., DRD1) may further include a plurality of control circuits or a single control circuit (not shown) for controlling each or all of the driving circuits DRC.

A host system HS may be connected to a system board SB, and the system board SB may be connected to a control circuit (not shown) operating in each of the display drivers DRD1, DRD2, DRD3, and DRD4. Therefore, the image signal to be reproduced on the large screen of the display device DD in which all display panels are coupled may be transmitted to each control circuit. The system board SB may synchronize the control circuits.

The system board SB may include a user interface port for receiving user inputs, an external interface port connected to an external device, a communication module for delaying various communication protocols, a processor for processing multi-media signals, a central processing unit (CPU), an external power supply device (not shown), and the like. The system board SB may transmit input image signals and timing signals synchronized with the image signals to the first to fourth display driving devices DRD1, DRD2, DRD3, and DRD4. The control circuits mounted on the display driving devices DRD1, DRD2, DRD3, and DRD4 may transmit the received image signals to display modules (e.g., DM1-1, DM1-2, DM1-3, and DM1-4), respectively and control the driving circuits DRC based on the timing signals synchronized with the image signals. The driving circuits DRC of the display modules (e.g., DM1-1, DM1-2, DM1-3, and DM1-4) may write image data to corresponding display panels (e.g., PN1-1, PN1-2, PN1-3, and PN1-4) under the control of the control circuits.

The external power supply device may include the main power supply circuit MPSC. The main power supply circuit MPSC may be connected to M display driving devices (M is a natural number of 2 or more). For example, the main power supply circuit MPSC may be connected to the first to fourth display driving devices DRD1, DRD2, DRD3, and DRD4 through flexible films, cables, or wires.

Each of the plurality of display driving devices DRD1, DRD2, DRD3, and DRD4 may include a control circuit, a power circuit PC, and a sensing circuit SC. At least one display driving device may further include the power control circuit PCC. The plurality of display modules DM1-1, DM1-2, DM1-3, and DM1-4 connected to one display driving device (e.g., DRD1) may share the control circuit, the power circuit PC1, and the sensing circuit SC1.

Each of the display driving devices DRD1, DRD2, DRD3, and DRD4 may be connected to N display modules DM (N is a natural number greater than or equal to 1). For example, the first display driving device DRD1 may be connected to driving circuits DRC of 1-1 to 1-4 display modules DM1-1, DM1-2, DM1-3, and DM1-4 through signal transmission paths. The second display driving device DRD2 may be connected to driving circuits of 2-1 to 2-4 display modules through signal transmission paths. The third display driving device DRD3 may be connected to driving circuits of 3-1 to 3-4 display modules through signal transmission paths. The fourth display driving device DRD4 may be connected to driving circuits of 4-1 to 4-4 display modules through signal transmission paths. The signal transmission paths may include flexible films, cables, or wires.

The first power circuit PC1 may be electrically connected to the main power supply circuit MPSC by first power cables 1111 and 1112.

The first power cables 1111 and 1112 may serve as the first power path that is a path through which the first input voltage may be applied from the main power supply circuit MPSC to the first power circuit PC1.

The first sensing circuit SC1 may be disposed on the first power cables 1111 and 1112. The first sensing circuit SC1 may be electrically connected to the main power supply circuit MPSC by the 1-1 power cable 1111. The first sensing circuit SC1 may be electrically connected to the first power circuit PC1 by the 1-2 power cable 1112.

The power control circuit PCC may be electrically connected to the first sensing circuit SC1 by the first sensing cable 1400 and the first transmission cable 1300. The power control circuit PCC may be electrically connected to the first power circuit PC1 by the first activation cable 1500. The power control circuit PCC may be electrically connected to the first control circuit (not shown) by the first timing cable (not shown). The first transmission cable 1300 may include an analog-to-digital converter.

The second power circuit PC2 may be electrically connected to the main power supply circuit MPSC by the second power cables 2111 and 2112.

The second power cables 2111 and 2112 may serve as the second power path that is a path through which the second input voltage may be applied from the main power supply circuit MPSC to the second power circuit PC2.

The second sensing circuit SC2 may be disposed on the second power cables 2111 and 2112. The second sensing circuit SC2 may be electrically connected to the main power supply circuit MPSC by the 2-1 power cable 2111. The second sensing circuit SC2 may be electrically connected to the second power circuit PC2 by the 2-2 power cable 2112.

The power control circuit PCC may be electrically connected to the second sensing circuit SC2 by the second sensing cable 2400 and the second transmission cable 2300. The power control circuit PCC may be electrically connected to the second power circuit PC2 by the second activation cable 2500. The second transmission cable 2300 may include an analog-to-digital converter.

A third power circuit PC3 may be electrically connected to the main power supply circuit MPSC by third power cables 3111 and 3112.

The third power cables 3111 and 3112 may serve as a third power path that is a path through which a third input voltage may be applied from the main power supply circuit MPSC to the third power circuit PC3.

The third sensing circuit SC3 may be disposed on the third power cables 3111 and 3112. The third sensing circuit SC3 may be electrically connected to the main power supply circuit MPSC by the 3-1 power cable 3111. The third sensing circuit SC3 may be electrically connected to the third power circuit PC3 by the 3-2 power cable 3112.

The power control circuit PCC may be electrically connected to the third sensing circuit SC3 by the third sensing cable 3400 and the third transmission cable 3300. The power control circuit PCC may be electrically connected to the third power circuit PC3 by the third activation cable 3500. The third transmission cable 3300 may include an analog-to-digital converter.

A fourth power circuit PC4 may be electrically connected to the main power supply circuit MPSC by fourth power cables 4111 and 4112.

The fourth power cables 4111 and 4112 may serve as a fourth power path that is a path through which a fourth input voltage may be applied from the main power supply circuit MPSC to the fourth power circuit PC4.

The fourth sensing circuit SC4 may be disposed on the fourth power cables 4111 and 4112. The fourth sensing circuit SC4 may be electrically connected to the main power supply circuit MPSC by the 4-1 power cable 4111. The fourth sensing circuit SC4 may be electrically connected to the fourth power circuit PC4 by the 4-2 power cable 4112.

The power control circuit PCC may be electrically connected to the fourth sensing circuit SC4 by a fourth sensing cable 4400 and a fourth transmission cable 4300. The power control circuit PCC may be electrically connected to a fourth power circuit PC4 by a fourth activation cable 4500. The fourth transmission cable 4300 may include an analog-to-digital converter.

For example, one power control circuit PCC may control operations of the first to fourth power circuits PC1 to PC4 based on the sensing results of the first to fourth sensing circuits SC1 to SC4. For example, the power control circuit PCC may include one (e.g., the first display driving device DRD1) of the first to fourth display driving devices DRD1 to DRD4.

Figure 10:
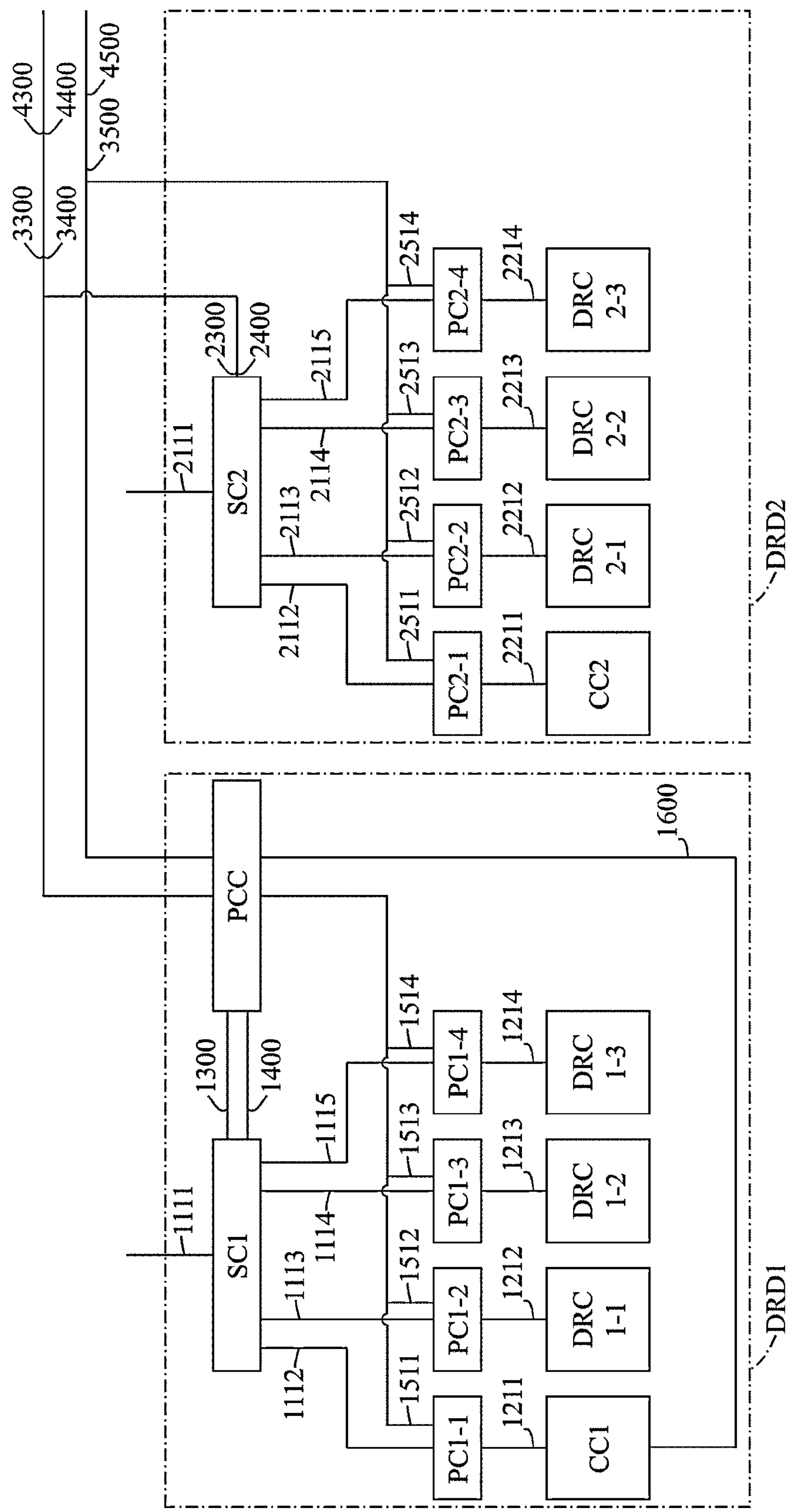
FIG. 10 is a schematic view showing a configuration and connection relationship between two display driving devices according to a sixth example embodiment of the present disclosure.

FIG. 10 is a schematic view showing a configuration and connection relationship between two display driving devices according to a sixth embodiment of the present disclosure. Components that perform substantially the same function as the above-described embodiments are denoted by the same reference numerals, and overlapping descriptions thereof will be omitted.

As shown in FIG. 10, the display device may include the external power supply device (not shown), the first display driving device DRD1, the second display driving device DRD2, a third display driving device (not shown), and a fourth display driving device (not shown). The first to fourth display driving devices may drive the first to fourth display modules, respectively.

The first display driving device DRD1 may include the first driving circuit DRC1 for driving the pixels of the first display panel provided in the first display module, and the first control circuit CC1 for controlling the first driving circuit DRC1. The first driving circuit DRC1 may include a 1-1 driving circuit DRC1-1, a 1-2 driving circuit DRC1-2, and a 1-3 driving circuit DRC1-3. For example, the 1-1 driving circuit DRC1-1 may be the above-described data driver. For example, the 1-2 driving circuit DRC1-2 may be the above-described gate driver. For example, the 1-3 driving circuit DRC1-3 may be a circuit for driving the above-described pixel circuit.

The first display driving device DRD1 may include the 1-1 power circuit PC1-1 for supplying power to the first control circuit CC1, the 1-2 power circuit PC1-2 for supplying power to the 1-1 driving circuit DRC1-1, a 1-3 power circuit PC1-3 for supplying power to the 1-2 driving circuit DRC1-2, a 1-4 power circuit PC1-4 for supplying power to the 1-3 driving circuit DRC1-3, the first sensing circuit SC1 for sensing a voltage and/or a current, and the like.

The first display driving device DRD1 may further include the power control circuit PCC for generating 1-1 to 1-4 power activation signals. The 1-1 power activation signal may activate the generation of the 1-1 PWM signal that suppresses the fluctuation of a constant voltage level output from the 1-1 power circuit PC1-1 to the first control circuit CC1. The 1-2 power activation signal may activate the generation of the 1-2 PWM signal that suppresses the fluctuation of a constant voltage level output from the 1-2 power circuit PC1-2 to the 1-1 driving circuit DRC1-1. The 1-3 power activation signal may activate the generation of the 1-3 PWM signal that suppresses the fluctuation of a constant voltage level output from the 1-3 power circuit PC1-3 to the 1-2 driving circuit DRC1-2. The 1-4 power activation signal may activate the generation of the 1-4 PWM signal that suppresses the fluctuation of a constant voltage level output from the 1-4 power circuit PC1-4 to the 1-3 driving circuit DRC1-3.

The 1-1 power circuit PC1-1 may be electrically connected to the main power supply circuit (not shown) by the 1-1 and 1-2 power cables 1111 and 1112. The 1-1 power circuit PC1-1 may be electrically connected to the first control circuit CC1 by the 1-1 wire 1211.

The 1-2 power circuit PC1-2 may be electrically connected to the main power supply circuit by the 1-1 and 1-3 power cables 1111 and 1113. The 1-2 power circuit PC1-2 may be electrically connected to the 1-1 driving circuit DRC1-1 by the 1-2 wire 1212.

The 1-3 power circuit PC1-3 may be electrically connected to the main power supply circuit by the 1-1 and 1-4 power cables 1111 and 1114. The 1-3 power circuit PC1-3 may be electrically connected to the 1-2 driving circuit DRC1-2 by the 1-3 wire 1213.

The 1-4 power circuit PC1-4 may be electrically connected to the main power supply circuit by the 1-1 and 1-5 power cables 1111 and 1115. The 1-4 power circuit PC1-4 may be electrically connected to the 1-3 driving circuit DRC1-3 by the 1-4 wire 1214.

The 1-1 and 1-2 power cables 1111 and 1112 may serve as the 1-1 power path that is a path through which the 1-1 input voltage may be applied from the main power supply circuit to the 1-1 power circuit PC1-1.

The 1-1 and 1-3 power cables 1111 and 1113 may serve as the 1-2 power path that is a path through which the 1-2 input voltage may be applied from the main power supply circuit to the 1-2 power circuit PC1-2.

The 1-1 and 1-4 power cables 1111 and 1114 may serve as the 1-3 power path that is a path through which the 1-3 input voltage may be applied from the main power supply circuit to the 1-3 power circuit PC1-3.

The 1-1 and 1-5 power cables 1111 and 1115 may serve as the 1-4 power path that is a path through which the 1-4 input voltage may be applied from the main power supply circuit to the 1-4 power circuit PC1-4.

The first sensing circuit SC1 may be disposed on the 1-1 power cable 1111. The first sensing circuit SC1 may be electrically connected to the main power supply circuit by the 1-1 power cable 1111. The first sensing circuit SC1 may be electrically connected to the 1-1 power circuit PC1-1 by the 1-2 power cable 1112. The second sensing circuit SC1 may be electrically connected to the 1-1 power circuit PC1-2 by a 1-3 power cable 1113. The first sensing circuit SC1 may be electrically connected to the 1-3 power circuit PC1-3 by the 1-4 power cable 1114. The first sensing circuit SC1 may be electrically connected to the 1-4 power circuit PC1-4 by the 1-5 power cable 1115.

Although not shown in the drawing, the present disclosure is not limited thereto, and the first sensing circuit may not be disposed on the 1-1 power cable. The first sensing circuit SC1 may include the 1-1 sensing circuit disposed on the 1-2 power cable 1112, the 1-2 sensing circuit disposed on the 1-3 power cable 1113, a 1-3 sensing circuit disposed on the 1-4 power cable 1114, and a 1-4 sensing circuit disposed on the 1-5 power cable 1115.

The power control circuit PCC may be electrically connected to the main power supply circuit by a power cable. The power control circuit PCC may be electrically connected to the first sensing circuit SC1 by the first sensing cable 1400 and the first transmission cable 1300. The power control circuit PCC may be electrically connected to the first control circuit CC1 by the first timing cable 1600. The first transmission cable 1300 may include an analog-to-digital converter.

The power control circuit PCC may be electrically connected to the 1-1 power circuit PC1-1 by the 1-1 activation cable 1511. The power control circuit PCC may be electrically connected to the 1-2 power circuit PC1-2 by the 1-2 activation cable 1512. The power control circuit PCC may be electrically connected to the 1-3 power circuit PC1-3 by the 1-3 activation cable 1513. The power control circuit PCC may be electrically connected to the 1-4 power circuit PC1-4 by the 1-4 activation cable 1514.

The second display driving device DRD2 may include the second driving circuit DRC2 for driving the pixels of the second display panel provided in the second display module, and the second control circuit CC2 for controlling the second driving circuit DRC2. The second driving circuit DRC2 may include a 2-1 driving circuit DRC2-1, a 2-2 driving circuit DRC2-2, and a 2-3 driving circuit DRC2-3. For example, the 2-1 driving circuit DRC2-1 may be the above-described data driver. For example, the 2-2 driving circuit DRC2-2 may be the above-described gate driver. For example, the 2-3 driving circuit DRC2-3 may be a circuit for driving the above-described pixel circuit.

The second display driving device DRD2 may include the 2-1 power circuit PC2-1 for supplying power to the second control circuit CC2, the 2-2 power circuit PC2-2 for supplying power to the 2-1 driving circuit DRC2-1, a 2-3 power circuit PC2-3 for supplying power to the 2-2 driving circuit DRC2-2, a 2-4 power circuit PC2-4 for supplying power to the 2-3 driving circuit DRC2-3, the second sensing circuit SC2 for sensing a voltage and/or a current, and the like.

The second display driving device DRD2 may further include the power control circuit PCC for generating the 2-1 power activation signal, the 2-2 power activation signal, a 2-3 power activation signal, and a 2-4 power activation signal. The 2-1 power activation signal may activate the generation of the 2-1 PWM signal that suppresses the fluctuation of a constant voltage level output from the 2-1 power circuit PC2-1 to the second control circuit CC2. The 2-2 power activation signal may activate the generation of the 2-2 PWM signal that suppresses the fluctuation of a constant voltage level output from the 2-2 power circuit PC2-2 to the 2-1 driving circuit DRC2-1. The 2-3 power activation signal may activate the generation of the 2-3 PWM signal that suppresses the fluctuation of a constant voltage level output from the 2-3 power circuit PC2-3 to the 2-2 driving circuit DRC2-2. The 2-4 power activation signal may activate the generation of the 2-4 PWM signal that suppresses the fluctuation of a constant voltage level output from the 2-4 power circuit PC2-4 to the 2-3 driving circuit DRC2-3.

The 2-1 power circuit PC2-1 may be electrically connected to the main power supply circuit (not shown) by the 2-1 and 2-2 power cables 2111 and 2112. The 2-1 power circuit PC2-1 may be electrically connected to the second control circuit CC2 by the 2-1 wire 2211.

The 2-2 power circuit PC2-2 may be electrically connected to the main power supply circuit by the 2-1 and 2-3 power cables 2111 and 2113. The 2-2 power circuit PC2-2 may be electrically connected to the 2-1 driving circuit DRC2-1 by the 2-2 wire 2212.

The 2-3 power circuit PC2-3 may be electrically connected to the main power supply circuit by the 2-1 and 2-4 power cables 2111 and 2114. The 2-3 power circuit PC2-3 may be electrically connected to the 2-2 driving circuit DRC2-2 by the 2-3 wire 2213.

The 2-4 power circuit PC2-4 may be electrically connected to the main power supply circuit by the 2-1 and 2-5 power cables 2111 and 2115. The 2-4 power circuit PC2-4 may be electrically connected to the 2-3 driving circuit DRC2-3 by the 2-4 wire 2214.

The 2-1 and 2-2 power cables 2111 and 2112 may serve as the 2-1 power path that is a path through which the 2-1 input voltage may be applied from the main power supply circuit to the 2-1 power circuit PC2-1.

The 2-1 and 2-3 power cables 2111 and 2113 may serve as the 2-2 power path that is a path through which the 2-2 input voltage may be applied from the main power supply circuit to the 2-2 power circuit PC2-2.

The 2-1 and 2-4 power cables 2111 and 2114 may serve as a 2-3 power path that is a path through which a 2-3 input voltage may be applied from the main power supply circuit to the 2-3 power circuit PC2-3.

The 2-1 and 2-5 power cables 2111 and 2115 may serve as a 2-4 power path that is a path through which a 2-4 input voltage may be applied from the main power supply circuit to the 2-4 power circuit PC2-4.

The second sensing circuit SC2 may be disposed on the 2-1 power cable 2111. The second sensing circuit SC2 may be electrically connected to the main power supply circuit by the 2-1 power cable 2111. The second sensing circuit SC2 may be electrically connected to the 2-1 power circuit PC2-1 by the 2-2 power cable 2112. The second sensing circuit SC2 may be electrically connected to the 2-2 power circuit PC2-2 by the 2-3 power cable 2113. The second sensing circuit SC2 may be electrically connected to the 2-3 power circuit PC2-3 by a 2-4 power cable 2114. The second sensing circuit SC2 may be electrically connected to the 2-4 power circuit PC2-4 by a 2-5 power cable 2115.

Although not shown in the drawing, the present disclosure is not limited thereto, and the second sensing circuit may not be disposed on the 2-1 power cable. The second sensing circuit SC2 may include the 2-1 sensing circuit disposed on the 2-2 power cable 2112, the 2-2 sensing circuit disposed on the 2-3 power cable 2113, a 2-3 sensing circuit disposed on the 2-4 power cable 2114, and a 2-4 sensing circuit disposed on the 2-5 power cable 2115.

The power control circuit PCC may be electrically connected to the main power supply circuit by the power cable. The power control circuit PCC may be electrically connected to the second sensing circuit SC2 by the second sensing cable 2400 and the second transmission cable 2300. The power control circuit PCC may be electrically connected to the first control circuit CC1 by the first timing cable 1600 or may be electrically connected to the second control circuit CC2 by the second timing cable (not shown). As shown, the power control circuit PCC is electrically connected to the first control circuit CC1. The second transmission cable 2300 may include an analog-to-digital converter.

The power control circuit PCC may be electrically connected to the 2-1 power circuit PC2-1 by the 2-1 activation cable 2511. The power control circuit PCC may be electrically connected to the 2-2 power circuit PC2-2 by the 2-2 activation cable 2512. The power control circuit PCC may be electrically connected to the 2-3 power circuit PC2-3 by the 2-3 activation cable 2513. The power control circuit PCC may be electrically connected to the 2-4 power circuit PC2-4 by the 2-4 activation cable 2514.

The third transmission cable 3300 and the third sensing cable 3400 that extend from the power control circuit PCC may electrically connect the power control circuit PCC with the third sensing circuit. The fourth transmission cable 4300 and the third sensing cable 4400 that extend from the power control circuit PCC may electrically connect the power control circuit PCC with the fourth sensing circuit.

The third activation cable 3500 extending from the power control circuit PCC may electrically connect the power control circuit PCC with the third power circuit. The fourth activation cable 4500 extending from the power control circuit PCC may electrically connect the power control circuit PCC with the fourth power circuit.

Figure 11:
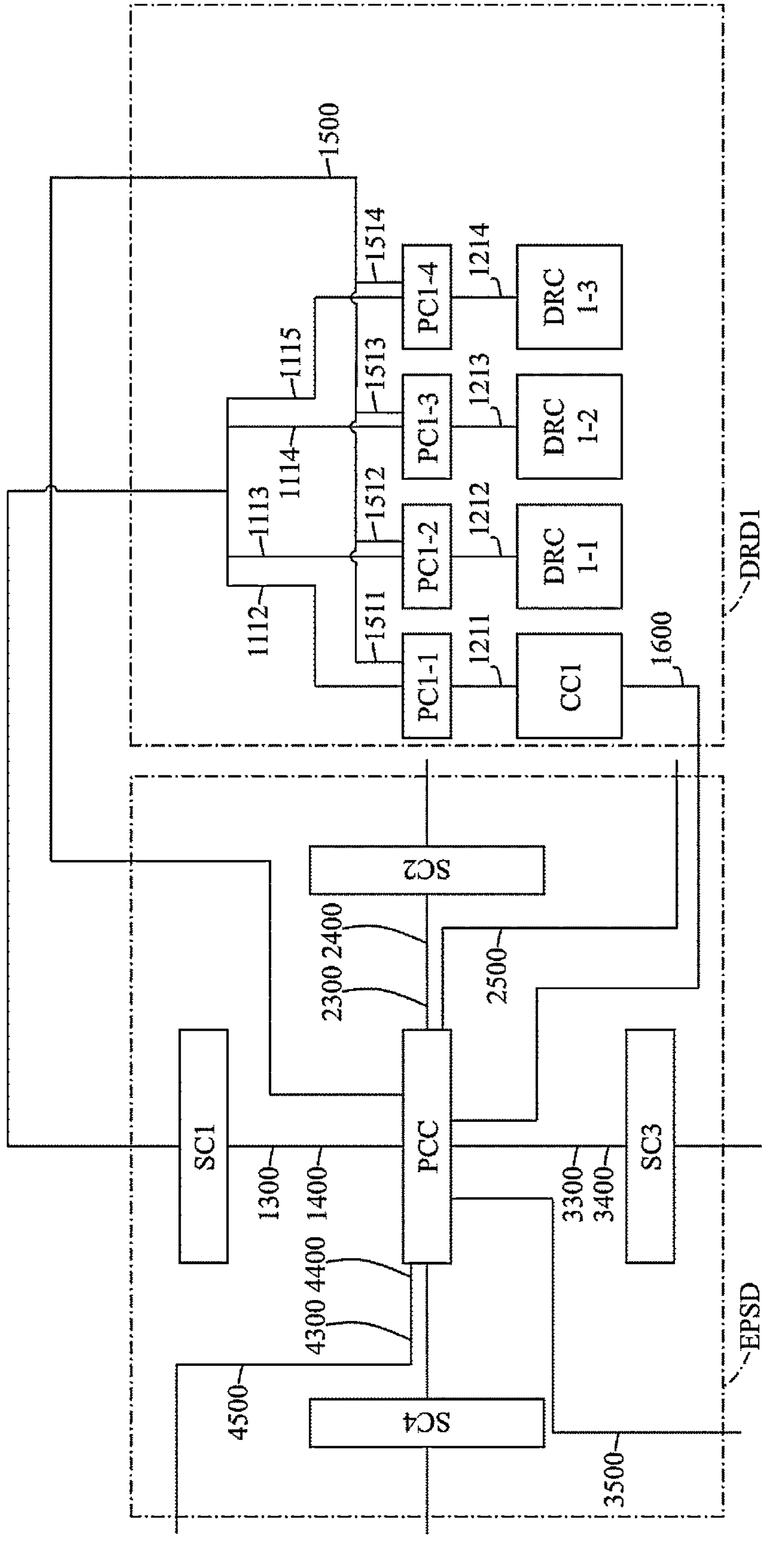
FIG. 11 is a schematic view showing a configuration and connection relationship between an external power supply device and a display driving device according to a seventh example embodiment of the present disclosure.

FIG. 11 is a schematic view showing a configuration and connection relationship between an external power supply device and a display driving device according to a seventh embodiment of the present disclosure. Components that perform substantially the same function between embodiments are denoted by the same reference numerals, and overlapping descriptions thereof will be omitted.

As shown in FIG. 11, the display device may include the external power supply device EPSD, the first display driving device DRD1, the second display driving device (not shown), the third display driving device (not shown), and the fourth display driving device (not shown). The first to fourth display driving devices may drive the first to fourth display modules, respectively.

The external power supply device EPSD may include the main power supply circuit (not shown) and first and fourth sensing circuits SC1, SC2, SC3, and SC4 for sensing a voltage and/or a current. The external power supply device EPSD may further include the power control circuit PCC for generating the 1-1 to 1-4 power activation signals. The 1-1 power activation signal may activate the generation of the 1-1 PWM signal that suppresses the fluctuation of a constant voltage level output from the 1-1 power circuit PC1-1 to the first control circuit CC1. The 1-2 power activation signal may activate the generation of the 1-2 PWM signal that suppresses the fluctuation of a constant voltage level output from the 1-2 power circuit PC1-2 to the 1-1 driving circuit DRC1-1. The 1-3 power activation signal may activate the generation of the 1-3 PWM signal that suppresses the fluctuation of a constant voltage level output from the 1-3 power circuit PC1-3 to the 1-2 driving circuit DRC1-2. The 1-4 power activation signal may activate the generation of the 1-4 PWM signal that suppresses the fluctuation of a constant voltage level output from the 1-4 power circuit PC1-4 to the 1-3 driving circuit DRC1-3.

The first display driving device DRD1 may include the first driving circuit DRC1 for driving the pixels of the first display panel provided in the first display module, and the first control circuit CC1 for controlling the first driving circuit DRC1.

The second transmission cable 2300 and the second sensing cable 2400 that extend from the power control circuit PCC may electrically connect the power control circuit PCC with the second sensing circuit. The third transmission cable 3300 and the third sensing cable 3400 that extend from the power control circuit PCC may electrically connect the power control circuit PCC with the third sensing circuit. The fourth transmission cable 4300 and the third sensing cable 4400 that extend from the power control circuit PCC may electrically connect the power control circuit PCC with the fourth sensing circuit.

The second activation cable 2500 extending from the power control circuit PCC may electrically connect the power control circuit PCC with the second power circuit. The third activation cable 3500 extending from the power control circuit PCC may electrically connect the power control circuit PCC with the third power circuit. The fourth activation cable 4500 extending from the power control circuit PCC may electrically connect the power control circuit PCC with the fourth power circuit.

Figure 12:
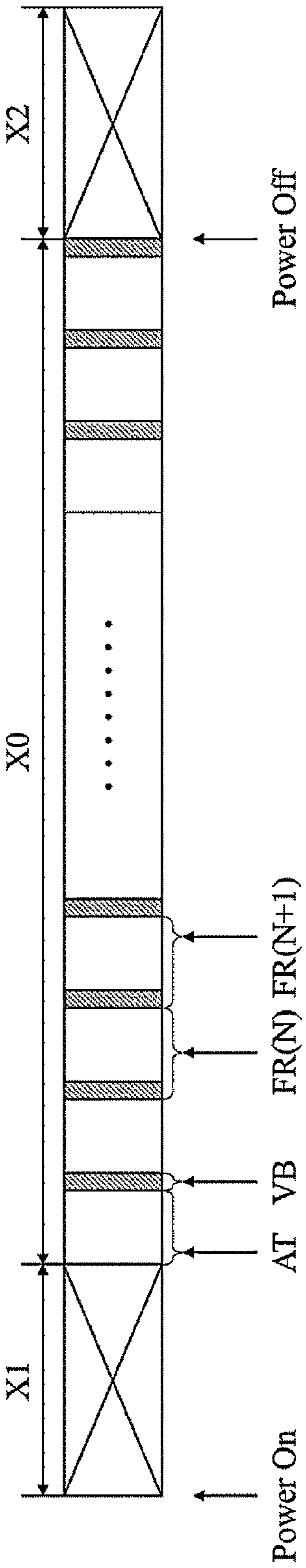
FIG. 12 is a view showing a driving period of the display device.

FIG. 12 is a view showing a driving period of the display device.

As shown in FIG. 12, a driving period of the display device may include first and second non-display periods X1 and X2 and an image display period X0. The first non-display period X1 can be defined as a section from power-on until a first frame starts. The second non-display period X2 can be defined as a section from power-off to power-on.

The image display period X0 may include an active section AT in which data voltages are written on sub-pixels and a vertical blank section VB in which image data is not written. A compensation period may be outside the active section AT. The compensation period may be included in the first and second non-display periods X1 and X2 or the vertical blank section VB. During the compensation period, the data driver may extract a threshold voltage of the driving transistor, and based on the same, calculate a change in threshold voltage to generate a compensation data voltage. The compensation period may include a programming period Tpg, a sensing period Tsen, and a sampling period Tsam.

The active section AT may include an $N^{th}$ frame FR(N) and an $(N+1)^{th}$ frame FR(N+1) (N is a natural number of 1 or more). A vertical blank section VB may be located between the $N^{th}$ frame FR(N) and the $(N+1)^{th}$ frame FR(N+1).

In the display device according to the embodiment, time intervals between the power activation signals generated by the power control circuit may be adjusted based on the result sensed in the $N^{th}$ frame FR(N).

Figure 13:
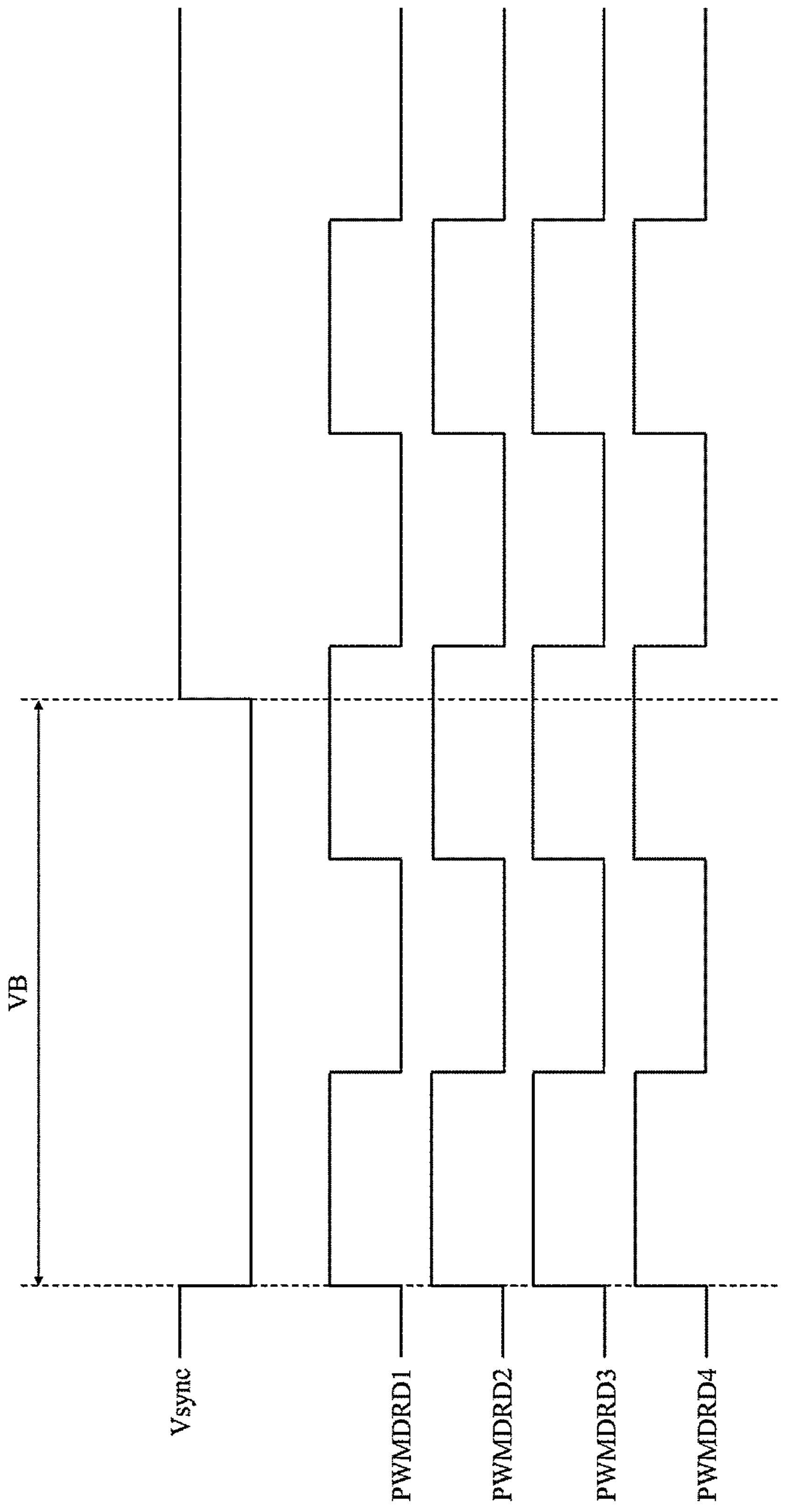
FIG. 13 is a view showing the timing of a power activation signal transmitted to each power circuit.
Figure 14:
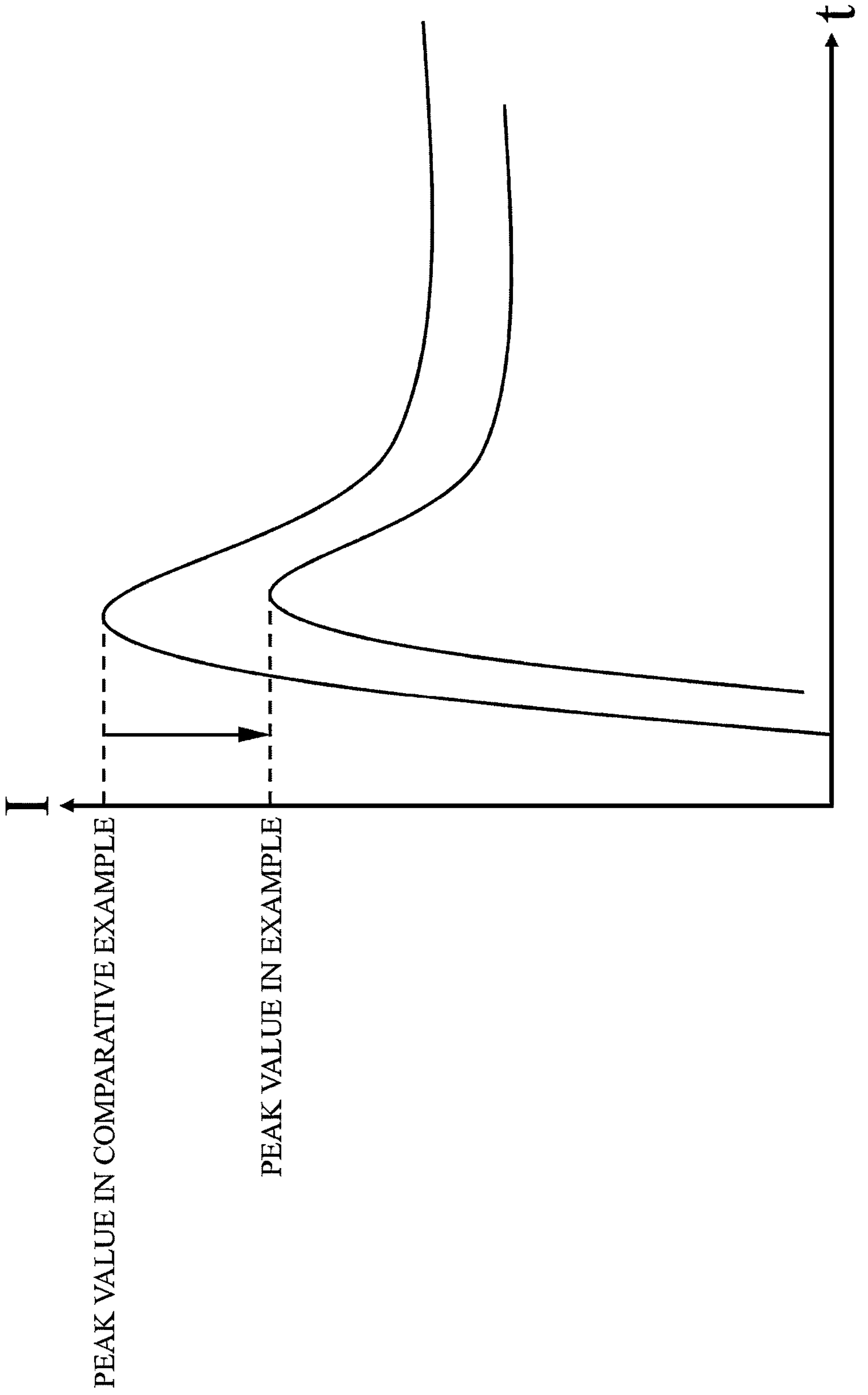
FIG. 14 is a view showing a peak current of a main power supply circuit and the reduction effect of the peak current.
Figure 15:
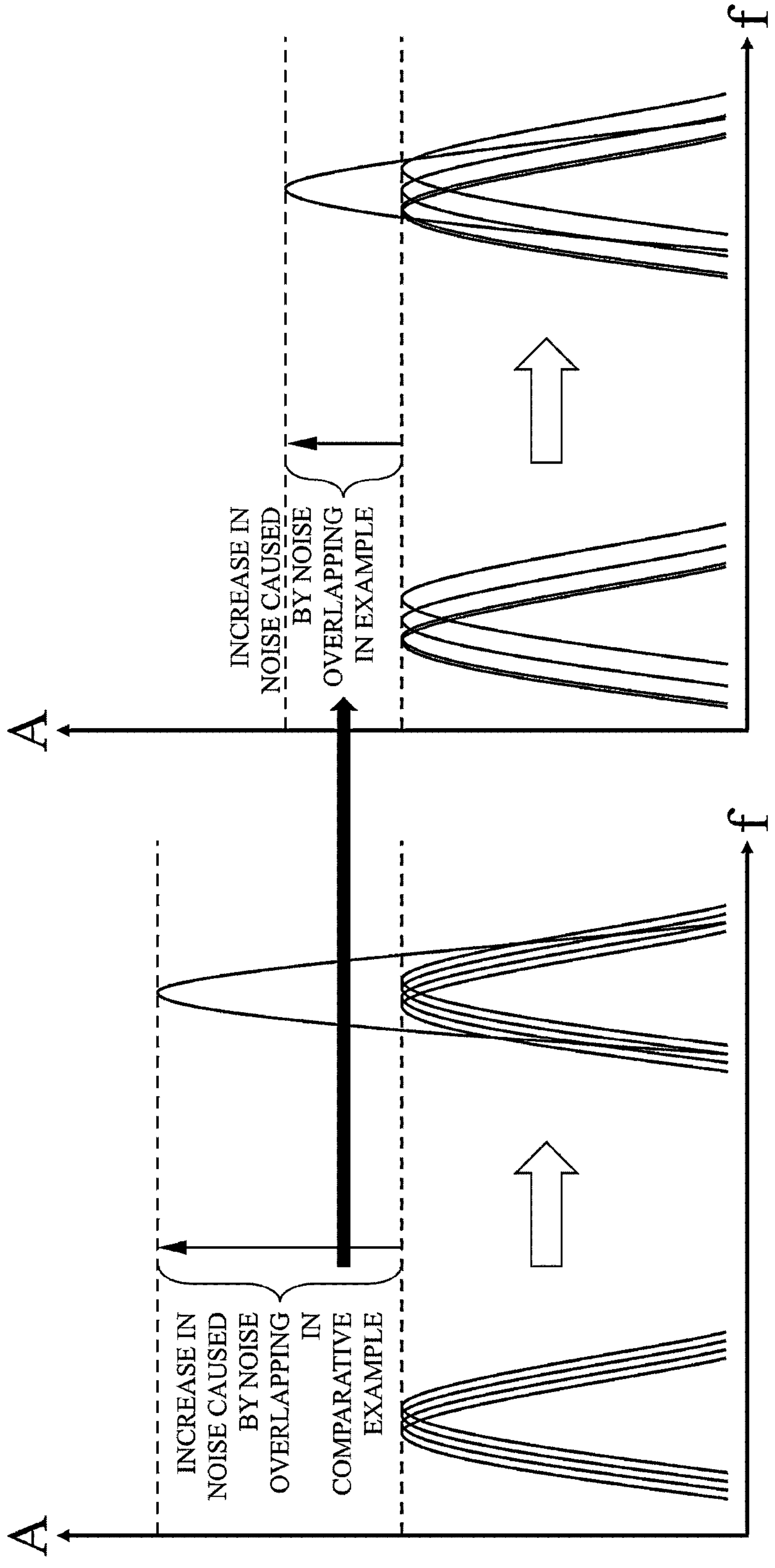
FIG. 15 is a view showing noise overlapping of the display driving device and the reduction effect of the noise overlapping.

FIG. 13 is a view showing the timing of a power activation signal transmitted to each power circuit. FIG. 14 is a view showing a peak current of a main power supply circuit and the reduction effect of the peak current. FIG. 15 is a view showing noise overlapping of the display driving device and the reduction effect of the noise overlapping.

As shown in FIGS. 13 to 15, the power circuit may include a DC-DC converter and output a constant voltage (or a DC voltage). The DC-DC converter may include a charge pump, a regulator, a buck converter, a boost converter, and the like.

PWM signals PWMDRD1, PWMDRD2, PWMDRD3, and PWMDRD4 generated by the power circuit may be enabled by the power activation signals supplied from the power control circuit to the power circuit. The PWM signal may control voltages input to the driving circuit and the control circuit.

The power circuit may start driving when the power activation signals are input from the power control circuit and output a voltage having a preset voltage level. The power activation signal may be a voltage level of an input voltage at which a target voltage at a preset level may be output from the power circuit. The power circuit can suppress changes in output voltage levels by generating the PWM signals PWMDRD1, PWMDRD2, PWMDRD3, and PWMDRD4 when the output voltage changes according to a change in load connected to an output terminal. For example, when the output voltage increases, the power circuit may decrease the output voltage levels by decreasing duty ratios of the PWM signals PWMMDRD1, PWMDRD2, PWMDRD3, and PWMDRD4, and when the output voltage decreases, increase the output voltage levels by increasing the duty ratios of the PWM signals PWMDRD1, PWMDRD2, PWMDRD3, and PWMDRD4, but the present disclosure is not limited thereto. The load may be a driving circuit and/or a control circuit. The load may depend on patterns and/or brightness (e.g., image data voltages according to grayscale values) of image data input to each display panel in the display module.

The power activation signal may be generated in the vertical blank section VB. In conventional display driving devices, a plurality of PWM signals are generated and transmitted at substantially the same timing. Therefore, as driving power or voltage is applied (input) to a plurality of power circuits from the main power supply circuit, a peak of a specific physical property (e.g., a current or a voltage) is generated by the main power supply circuit, resulting in a problem that EMI exceeding the established standards is measured.

When the power or voltages output through a plurality of output terminals from the main power supply circuit increases simultaneously, the intensity of the peak current measured at the main power supply circuit increases, and thus EMI exceeds the allowable limit, resulting in malfunctions of or damage to nearby devices. In addition, power noises, such as a ripple and a rush current, applied to the display driving devices may be generated, thereby making the operations of the display driving devices unstable. The overlapping noises may appear. Therefore, it is necessary to reduce EMI phenomenon and noise caused by the peak of the specific physical property (e.g., a current).

The display driving device and the display device according to example embodiments of the present disclosure can reduce the peak current generated by the main power supply circuit as the power activation signals have time intervals (see FIG. 14). In addition, it is possible to minimize an increase in noise caused by the overlapping noises observed from each display driving device (see FIG. 15).

Figure 16:
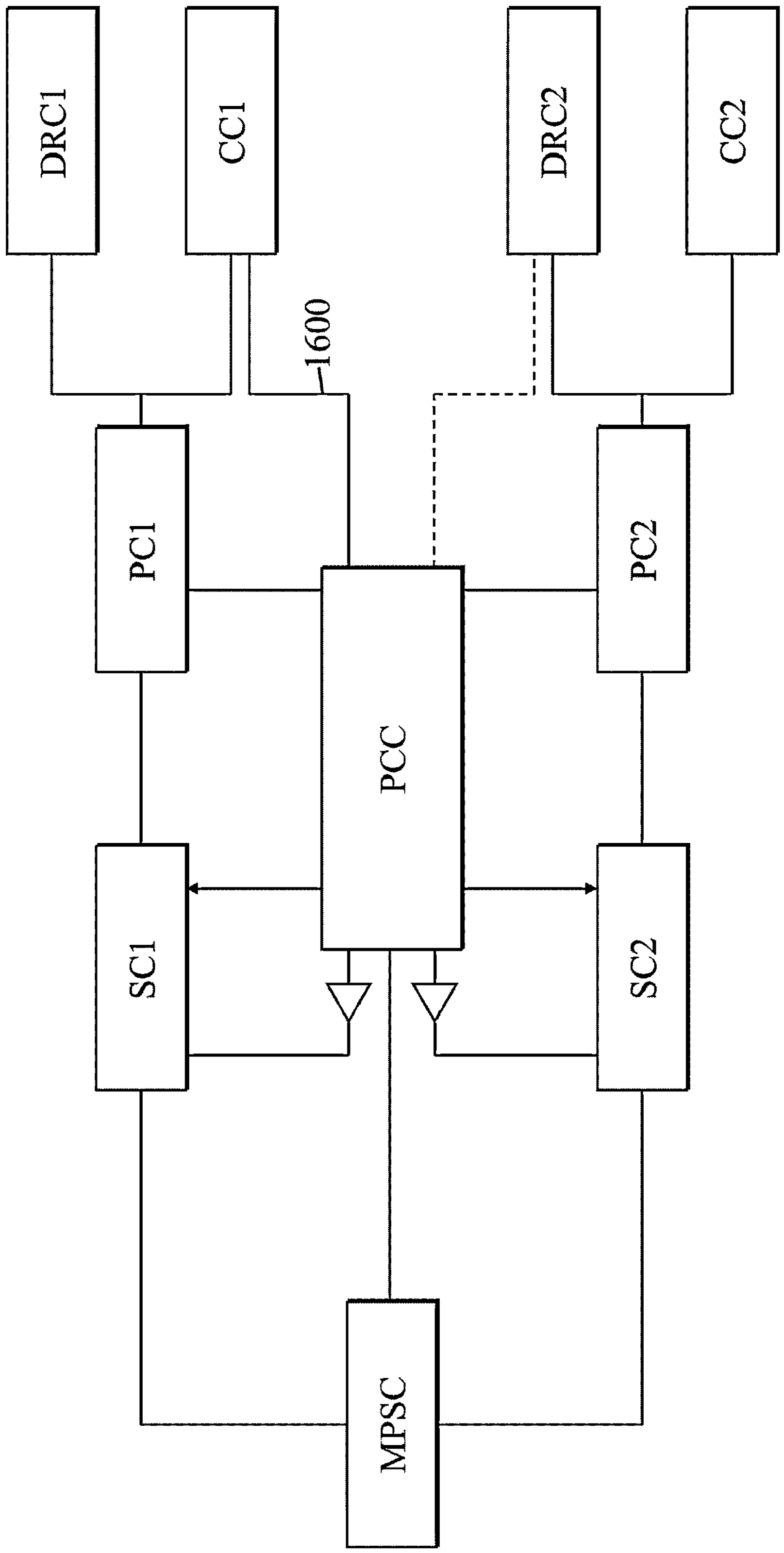
FIG. 16 is a view showing the generation and transmission of a sensing signal.

FIG. 16 is a view showing the generation and transmission of a sensing signal.

As shown in FIG. 16, the power control circuit PCC may be connected to the first control circuit CC1 by the first timing cable 1600 to receive the timing signal synchronized with the image signal. The first control circuit CC1 may include a level shifter. The timing signals may include driving signals, such as a data enable signal DE, a vertical synchronization signal Vsync, a horizontal synchronization signal Hsync, a gate timing control signal GTCS, a data timing control signal DTCS, and a dot clock signal MCLK, but is not limited thereto.

The power control circuit PCC may receive the timing signals to determine the number of sensing times and generate and output sensing signals. The sensing signal may be input to the sensing circuits SC1 and SC2.

The number of sensing times may be determined according to the frequency of the timing signal synchronized with the image signal.

Figure 17:
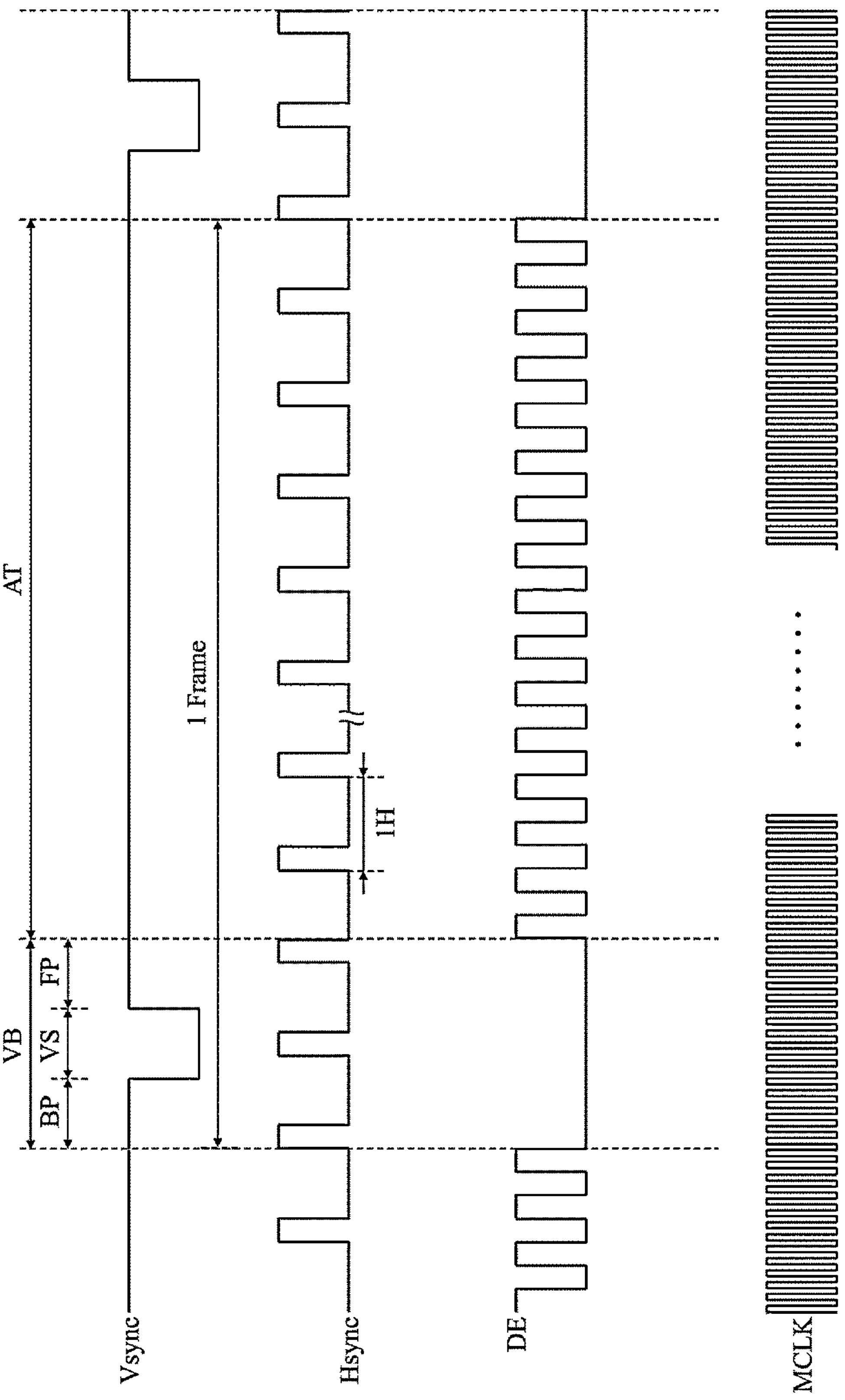
FIG. 17 is a waveform diagram showing a timing signal synchronized with an image signal.
Figure 18:
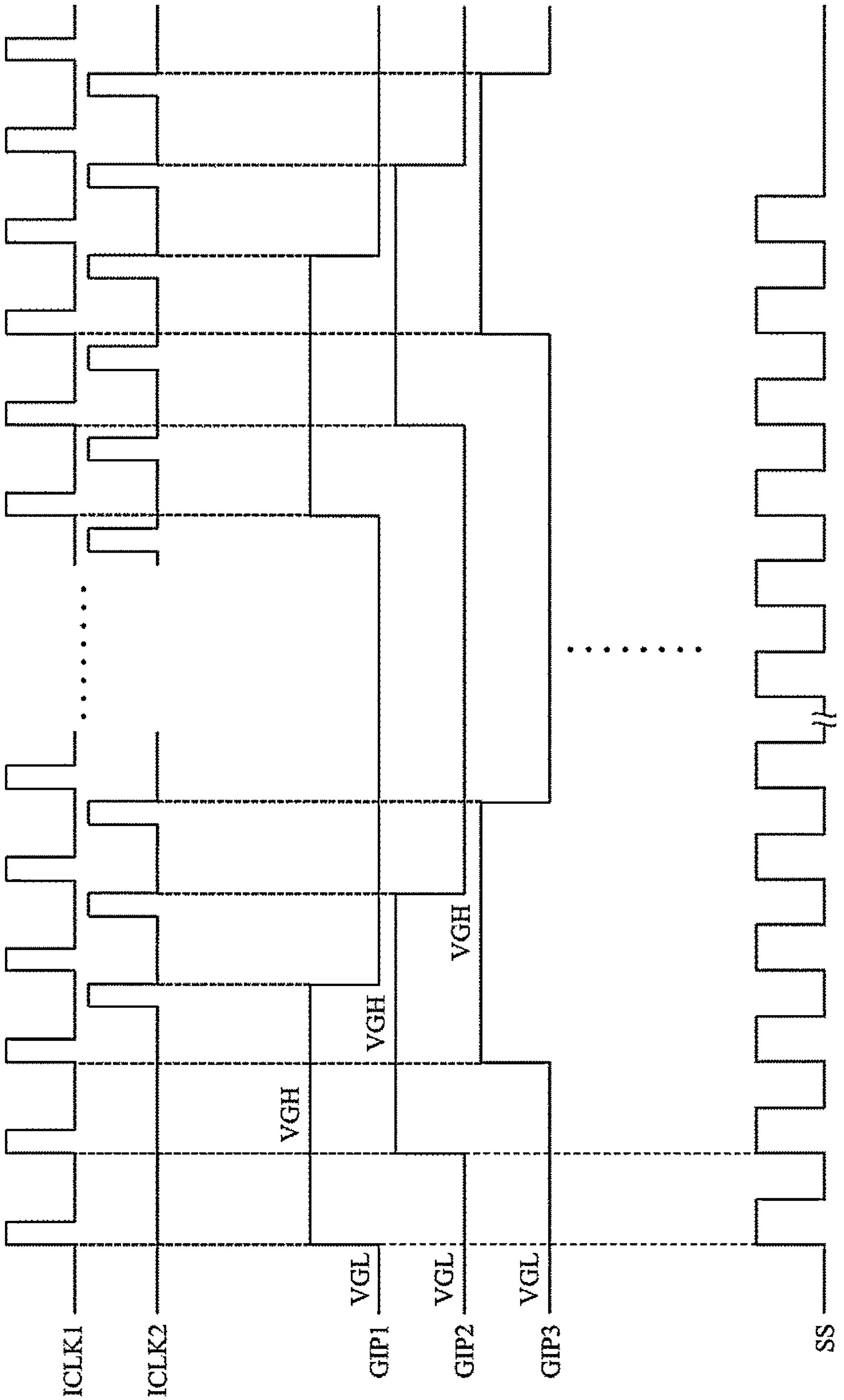
FIG. 18 is a waveform diagram showing a process of determining a sensing frequency using input/output signals and a gate timing control signal of a level shifter.

FIG. 17 is a waveform diagram showing a timing signal synchronized with an image signal. FIG. 18 is a waveform diagram showing a process of determining a sensing frequency using input/output signals and a gate timing control signal of a level shifter.

As shown in FIG. 17, the vertical synchronization signal Vsync can define one frame section (1 frame). The one frame section (1 frame) may be a time of the sum of the active section AT and the vertical blank section VB. The vertical blank section VB may be allocated as a predetermined time between an active section AT of an $N^{th}$ frame section and an active section AT of an $(N+1)^{th}$ frame section. The control circuit may receive the data enable signal DE and the data of the input image during the active period AT. The data enable signal DE and the data of the input image may not be present in the vertical blank section VB. Data of 1 frame to be written on pixels may be received by the control circuit during the active period AT.

The horizontal synchronization signal Hsync can define one horizontal period (1 horizontal time, 1H). The data enable signal DE can define a valid pixel data section by being synchronized with the pixel data to be displayed on the display panel of the display module. One pulse cycle of the data enable signal DE is one horizontal period 1H, and a high logic section of the data enable signal DE indicates a pixel data input section of one pixel line. One horizontal period 1H is the time required to write data to the pixels of one pixel line in the display panel. The pixel line may include pixels arranged in a gate line direction and connected to the same gate line. Pixels of one pixel line may share a gate line to which a gate signal (or a scan signal) is applied and be addressed simultaneously according to the scan signal to receive data voltages of pixel data.

As can be seen from the data enable signal DE, input data may not be received by the display device during the vertical blank section VB. The vertical blank section VB may include a vertical sync time VS, a vertical front porch FP, and a vertical back porch BP.

As shown in FIG. 18, first and second input clocks ICLK1 and ICLK2 may be generated by the timing controller and input to the level shifter. A driver provided in the level shifter may turn on a pull-up transistor in response to the first input clock ICLK1 and turn on a pull-down transistor in response to the second input clock ICLK2. The driver may turn on the pull-up transistor at a rising edge of the first input clock ICLK1 and turn on the pull-down transistor at a falling edge of the second input clock ICLK2, but the present disclosure is not limited thereto. The level shifter may output gate timing control signals GIP1, GIP2, GIP3, . . . of which phases are sequentially shifted through a plurality of channels. The driver may transmit a carry signal to a driver of a next channel. The driver of the next channel may be enabled when receiving the carry signal to generate an output. At least some of the gate timing control signals GIP1, GIP2, GIP3, . . . output from the level shifter may overlap. In this case, the gate driver that receives the gate timing control signals GIP1, GIP2, GIP3, . . . may sequentially supply gate pulses of which at least some overlap each other to the gate lines.

The turn-on/off timing and frequency of a sensing signal SS may be determined based on ON (or OFF) sections of the gate timing control signals GIP1, GIP2, GIP3, . . . output from the level shifter.

Figure 19:
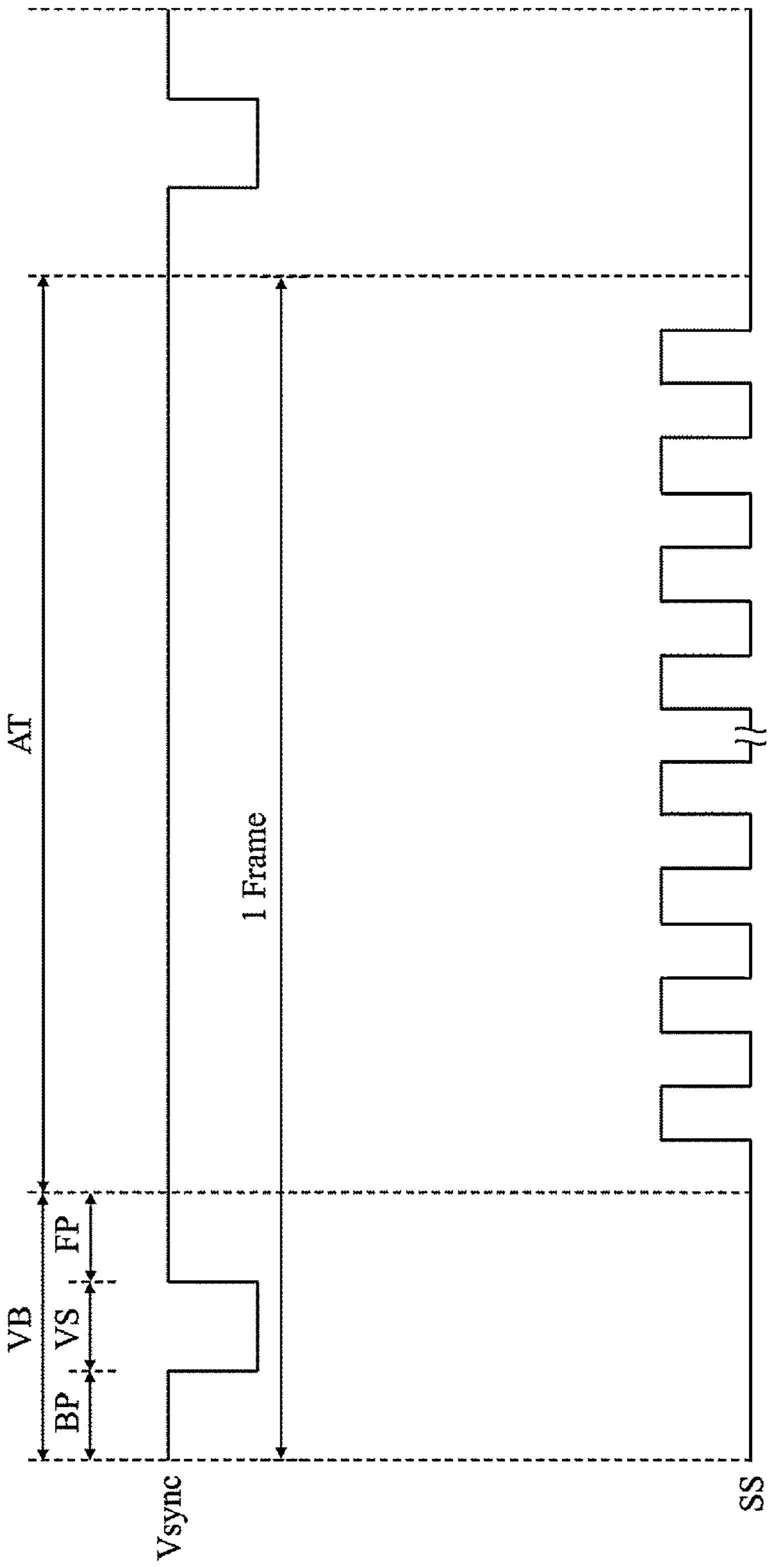
FIG. 19 is a waveform diagram showing a process of determining a sensing frequency using a vertical synchronization signal.
Figure 20:
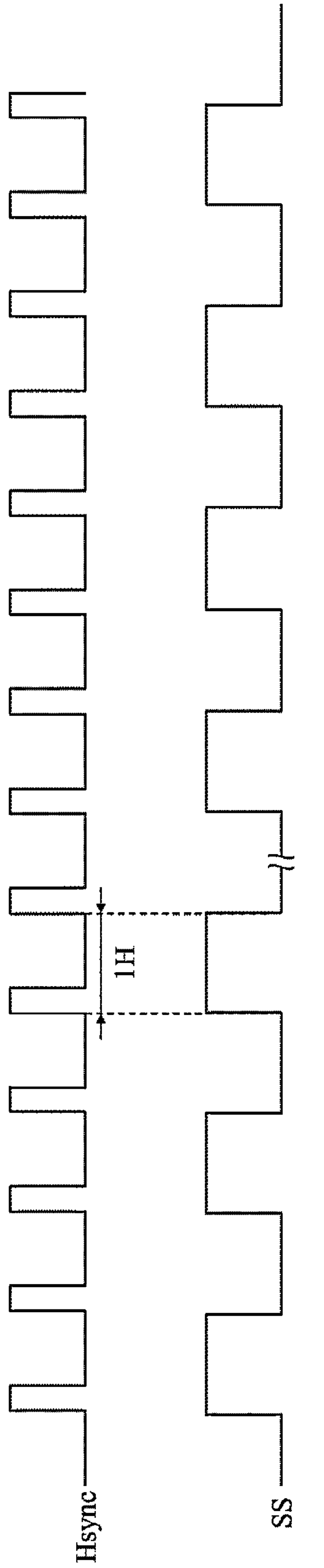
FIG. 20 is a waveform diagram showing a process of determining a sensing frequency using a horizontal synchronization signal.
Figure 21:
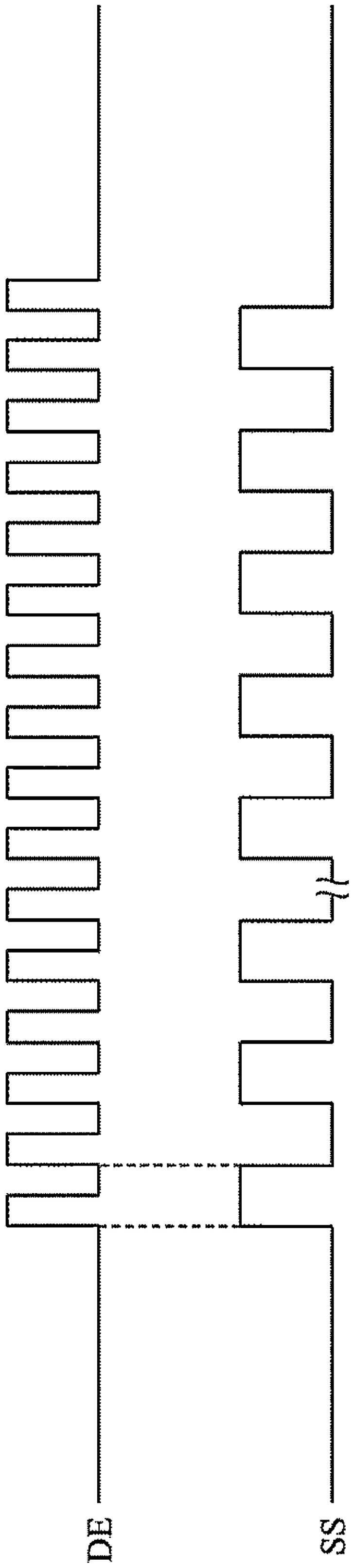
FIG. 21 is a waveform diagram showing a process of determining a sensing frequency using a data enable signal.

FIG. 19 is a waveform diagram showing a process of determining a sensing frequency using a vertical synchronization signal. FIG. 20 is a waveform diagram showing a process of determining a sensing frequency using a horizontal synchronization signal. FIG. 21 is a waveform diagram showing a process of determining a sensing frequency using a data enable signal.

As shown in FIG. 19, the turn-on/off timing of the sensing signal SS may be determined based on one frame section (1 frame) of the vertical synchronization signal Vsync. The frequency of the sensing signal SS may be determined based on the turn-on/off timing. For example, when a refresh rate of the display device is 60 Hz, a time interval in the one frame section is 16.67 ms. Assuming that the time interval in the active section is 16 ms, when sensing is performed 8 times in the active section, a frequency of the number of sensing times in the active section may be 500 Hz. However, the present disclosure is not limited thereto, and the turn-on/off timing and frequency of the sensing signal SS may be determined based on the vertical blank section VB and the active section AT.

As shown in FIG. 20, the turn-on/off timing and frequency of the sensing signal SS may be determined based on one horizontal period 1H. For example, when the refresh rate of the display device is 60 Hz and the resolution is FHD (1920×1080), the 1H period may be 1/(60×1080) s and the frequency of the sensing signal SS in the active period may be 30×1080=32,400 Hz.

As shown in FIG. 21, the turn-on/off timing and frequency of the sensing signal SS may be determined based on a section in which data is input similar to those described above with reference to FIGS. 19 and 20.

Figure 22:
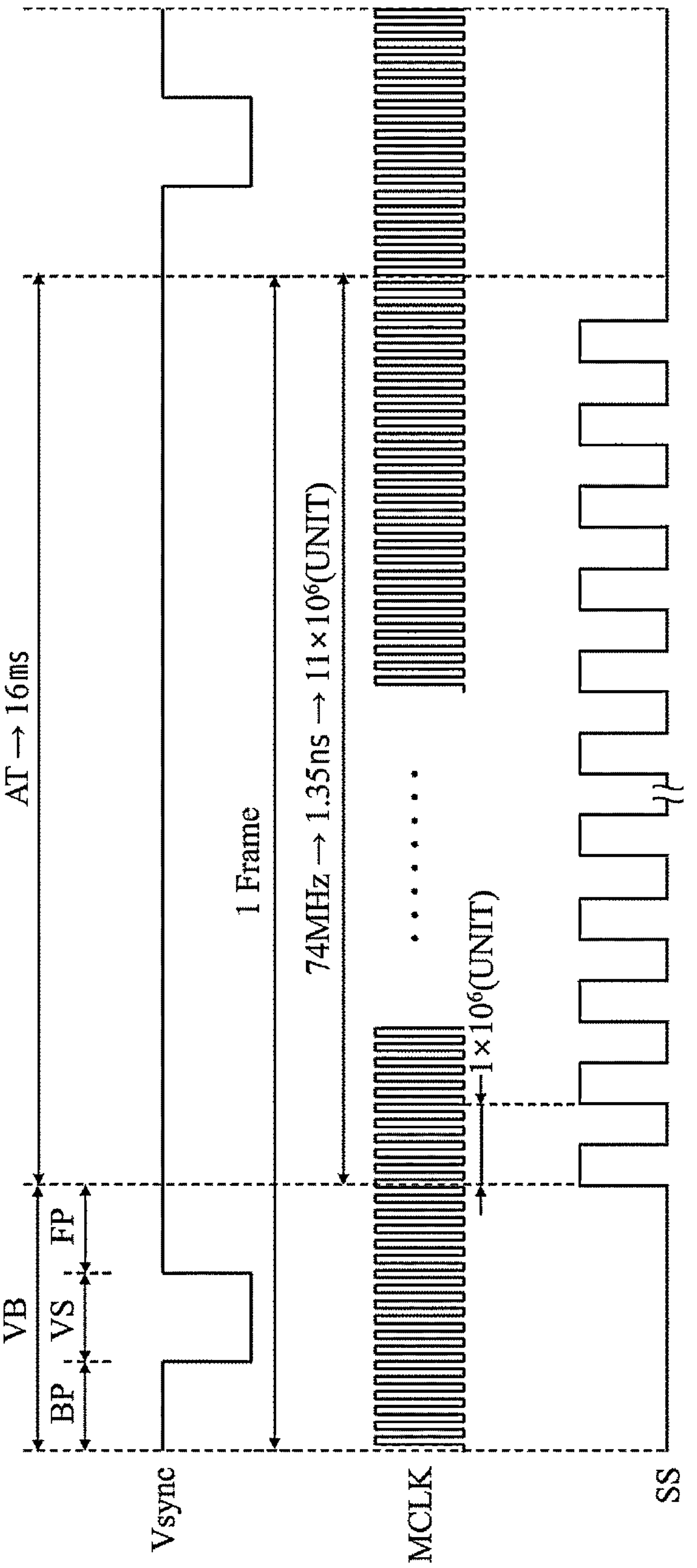
FIG. 22 is a waveform diagram showing a process of determining a sensing frequency using a dot clock signal.

FIG. 22 is a waveform diagram showing a process of determining a sensing frequency using a dot clock signal.

As shown in FIG. 22, the turn-on/off timing and frequency of the sensing signal SS may be determined based on the number of dot clock signals MCLK. For example, when the refresh rate of the display device is 60 Hz (=16.67 ms), a frequency of the clock signal is 74 MHz (=1.35 ns), and the time interval in the active section is 16 ms, the number of clock signals in the active section is about $11\times10^6$. When sensing is performed in a unit of $1\times10^6$ clock signals, the sensing is performed 11 times in the active section, and the frequency of the sensing signal in the active section is about 700 Hz.

Figure 23:
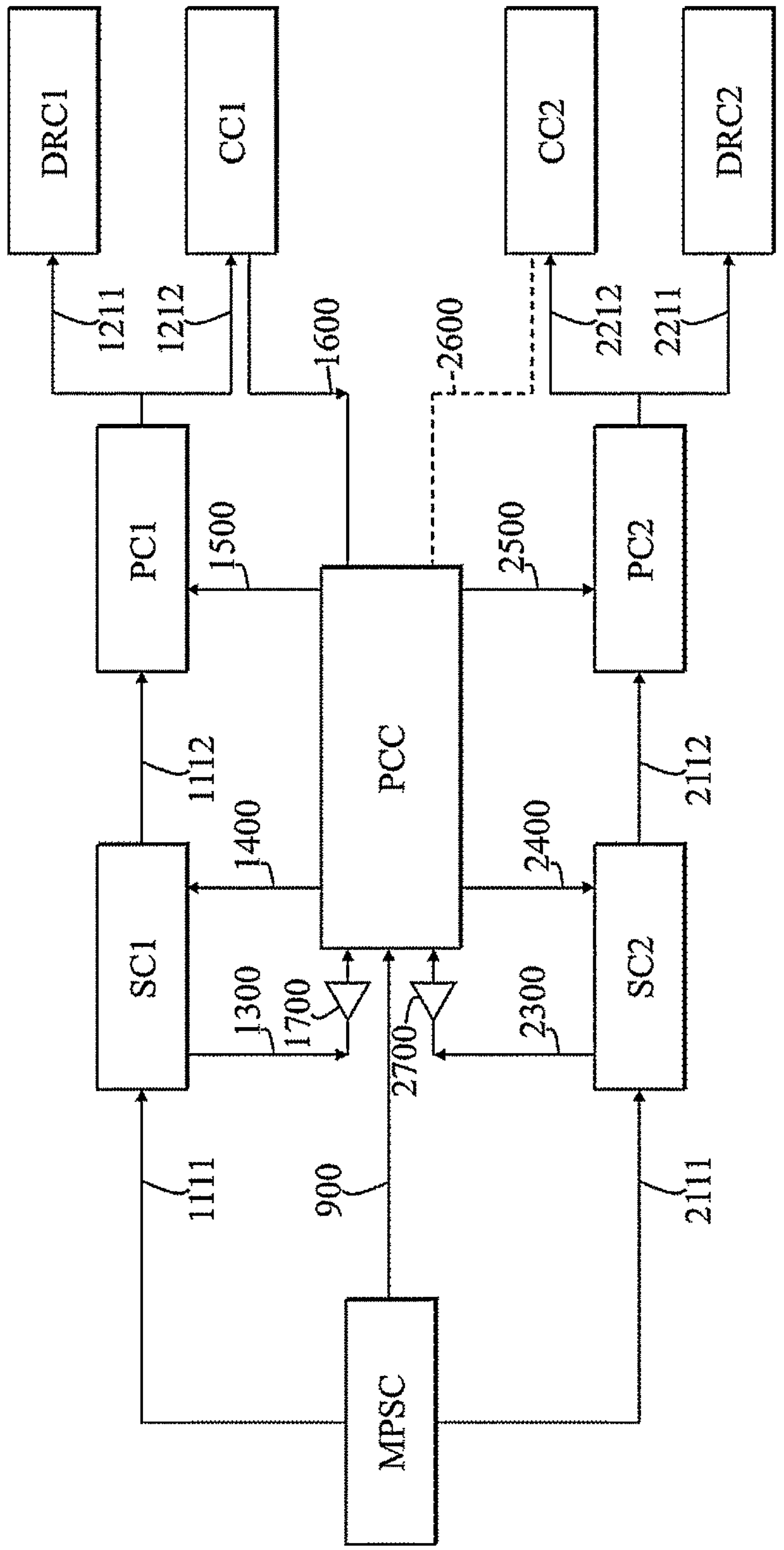
FIG. 23 is a view showing functions and operations of components of the display driving device.

FIG. 23 is a view showing functions and operations of components of the display driving device.

As shown in FIG. 23, the main power supply circuit MPSC may supply power to the power circuits PC1 and PC2 through the power cables 1111, 1112, 2111, and 2112. The first power cables 1111 and 1112 may serve as the first power path that is a path through which the first input voltage may be applied from the main power supply circuit MPSC to the first power circuit PC1. The second power cables 2111 and 2112 may serve as the second power path that is a path through which the second input voltage may be applied from the main power supply circuit MPSC to the second power circuit PC2.

The power control circuit PCC may determine the frequency, number of sensing times, and the like of the sensing signal based on the timing signals received from the first control circuit CC1 (or the second control circuit CC2) through the timing cable 1600 and transmit the sensing signal instructing sensing to the sensing circuits SC1 and SC2. The sensing signal may be transmitted to the sensing circuits SC1 and SC2 through the sensing cables 1400 and 2400.

The first and second sensing circuits SC1 and SC2 that receive the sensing signal may be disposed on the first and second power cables 1111 and 2111, respectively to sense first and second voltages or currents applied to the first and second power circuits PC1 and PC2. The first and second currents may be current values consumed by the power circuit. The first and second voltages (or currents) may be transmitted to the power control circuit PCC through the first and second transmission cables 1300 and 2300, respectively.

The first and second voltage or current values may be converted into digital values through analog-to-digital converters (ADCs) 1700 and 2700 provided in the first and second transmission cables 1300 and 2300 and transmitted to the power control circuit PCC.

The power control circuit PCC may calculate a current consumption value of each power circuit based on the first and second voltage or current values. Based on the calculated current consumption value, the power control circuit PCC may determine current values consumed by each display driving device (and/or the panel). In one display device, image data input to each display panel constituting one display device may differ depending on the location, arrangement, time, or space of the panel. Even when only one frame is performed, image data with different brightness and/or grayscale values depending on the location needs to be input. As image data is expressed at relatively high brightness and/or high grayscale, a current consumed by the display panel to which the image data is input may be greater. Alternatively, as the image data is expressed at relatively low brightness and/or low grayscale, a current consumed by the display panel to which the image data is input may be smaller. Considering the same, current values consumed by the display panel or the display driving device may be changed.

The power control circuit PCC may determine the time intervals between the power activation signals to be input to the power circuits PC1 and PC2 based on the determined current consumption values. When at least one of the determined current consumption values is greater than a preset threshold, the power control circuit PCC may increase the time interval between the first power activation signal and the second power activation signal.

The preset threshold may be an arithmetic average of the plurality of currents input to each power circuit. However, the present disclosure is not limited thereto, and the preset threshold may be set in consideration of current values generally consumed by the display driving devices. The power control circuit PCC may determine the order of the power activation signals to be input to the power circuits PC1 and PC2 based on the determined current consumption values.

The power circuits PC1 and PC2 may receive the power activation signals reflecting the time intervals between the power activation signals from the power control circuit PCC through the activation cables 1500 and 2500. The first power circuit PC1 may input power to the first driving circuit DRC1 and the first control circuit CC1 in response to the first power activation signal received from the power control circuit PCC through the first activation cable 1500. The second power circuit PC2 may input power to the second driving circuit DRC2 and the second control circuit CC2 in response to the second power activation signal received from the power control circuit PCC through the second activation cable 2500. The first power activation signal transmitted to the first power circuit PC1 may activate the first PWM signal of the first power circuit PC1. The second power activation signal may activate the second PWM signal of the second power circuit PC2. The first and second PWM signals may be transmitted to the first and second driving circuits DRC1 and DRC2 and the first and second control circuits CC1 and CC2 and may be the basis of a command that allows the first and second driving circuits DRC1 and DRC2 and the first and second control circuits CC1 and CC2 to receive power.

The first and second driving circuits DRC1 and DRC2 and the first and second control circuits CC1 and CC2 that receive the first and second PWM signals may receive power. The first PWM signal may be transmitted to the first driving circuit DRC1 and the first control circuit CC1 through the 1-1 wire 1211 and the 1-2 wire 1212, respectively. The second PWM signal may be transmitted to the second driving circuit DRC2 and the second control circuit CC2 through the 2-1 wire 2211 and the 2-2 wire 2212, respectively.

Figure 24:
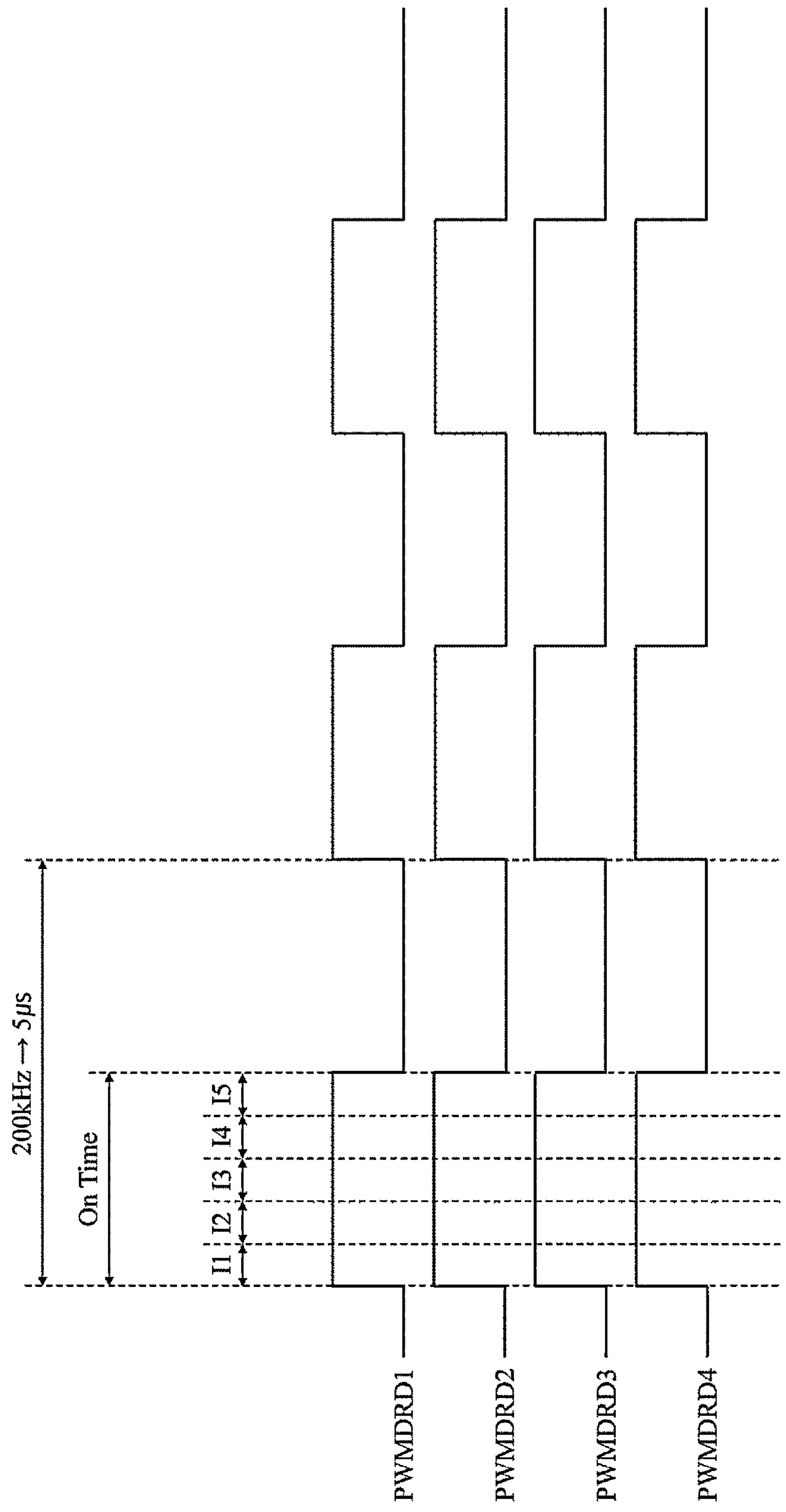
FIGS. 24 and 25 are views showing various examples of time intervals between power activation signals.
Figure 25:
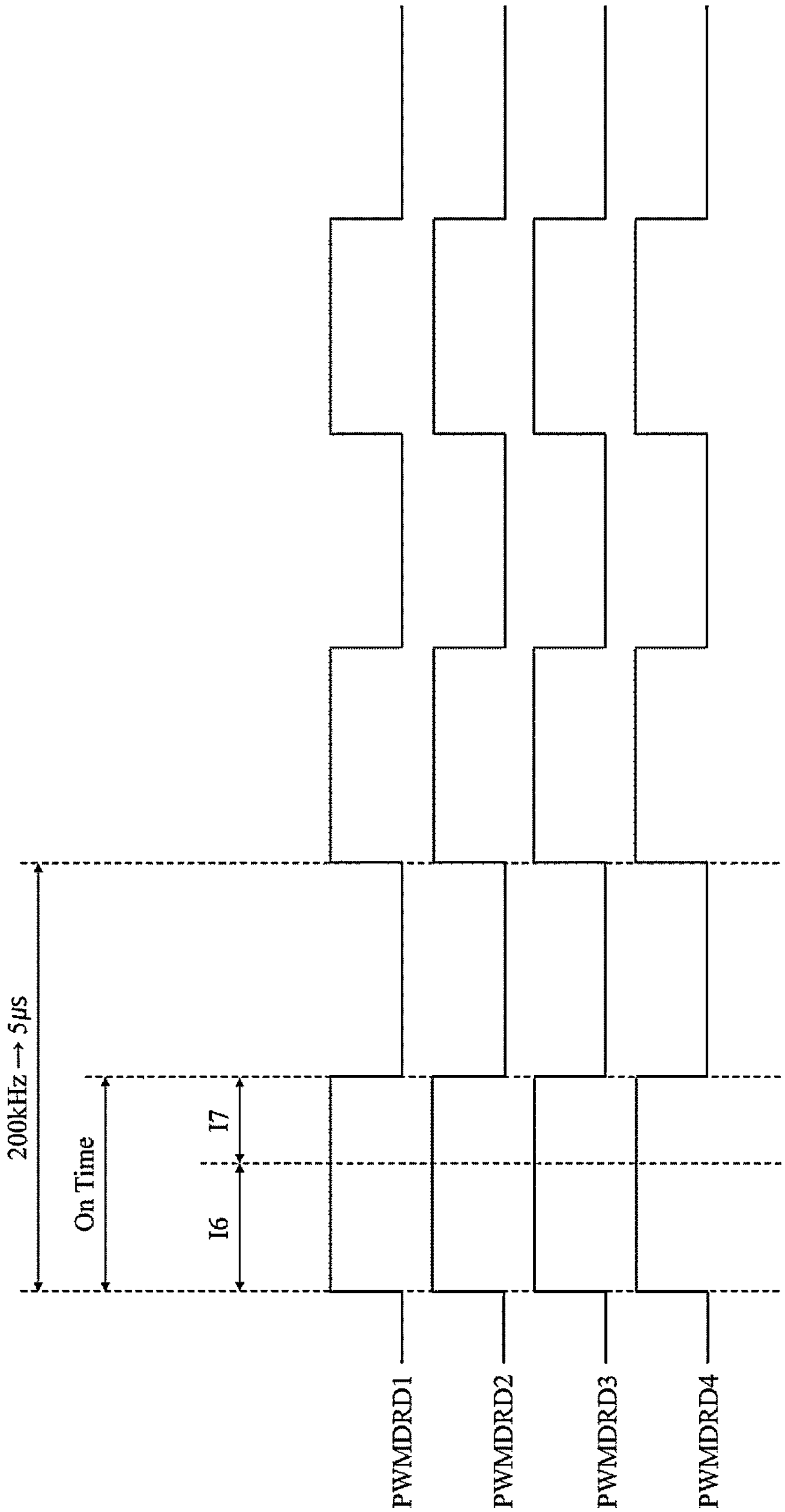

FIGS. 24 and 25 are views showing various examples of time intervals between power activation signals.

As shown in FIG. 24, the time intervals between the power activation signals may be determined based on the frequency and duty ratio of the PWM signal output from the power circuit for supplying power to each display driving device. For example, when the duty ratio of one cycle of the PWM signals PWMMDRD1, PWMDRD2, PWMDRD3, and PWMDRD4 is K % ($0 \leq K \leq 100$), the time intervals between the power activation signals is in the range of 0.2K % to 0.6K %. Specifically, when the frequency of the PWM signal PWMMDRD1 is 200 kHz and the duty ratio thereof is 50%, a time length of one cycle of the PWM signal PWMMDRD1 is 5 μs, and a time length of an ON-time section is 2.5 μs. Assuming that the time intervals between the power activation signals are all constant, time intervals I1, I2, I3, I4, and I5 of the power activation signals may be 2.5 μs/5=0.5 μs. Therefore, in this case, the time interval between the power activation signals is 0.5 μs/5 μs×100(%) =0.2×50(%)=10% of one cycle of the PWM signal.

As shown in FIG. 25, for example, when the duty ratios of one cycle of the PWM signals PWMMDRD1, PWMMDRD2, PWMMDRD3, and PWMMD4 are K % ($0 \leq K \leq 100$), the time intervals between the power activation signals are in the range of 0.2K % to 0.6K %. Specifically, when the frequency of the PWM signal PWMMDRD1 is 200 kHz and the duty ratio thereof is 50%, the time length of one cycle of the PWM signal PWMMDRD1 is 5 μs, and the time length of the ON-time section is 2.5 μs. Assuming that the time intervals between the power activation signals are exemplarily all constant, the time interval I6 of the power activation signals may be 2.5 μs×0.6=1.5 μs. Therefore, in this case, the time interval between the power activation signals is 1.5 μs/5 μs×100(%)=0.6×50(%)=30% of one cycle of the PWM signal.

FIG. 26 is a simulation result table for determining an optimal time interval numerical range of the power activation signals.

As shown in FIG. 26, a gain value indicates a reduction in noise compared to before the time interval between the power activation signals is present. When eight driving devices were used, it was confirmed that the gain values were decreased in Examples 2, 3, and 5 compared to Comparative Example 1. It is confirmed that the optimized time interval between the power activation signals is between 0.5 μs and 1.5 μs. Therefore, when the duty ratio of one cycle of the PWM signals is K % ($0 \leq K \leq 100$), the time interval between the power activation signals according to an example embodiment may be in the range of 0.2K % to 0.6K % of one cycle of the PWM signal.

Figure 27:
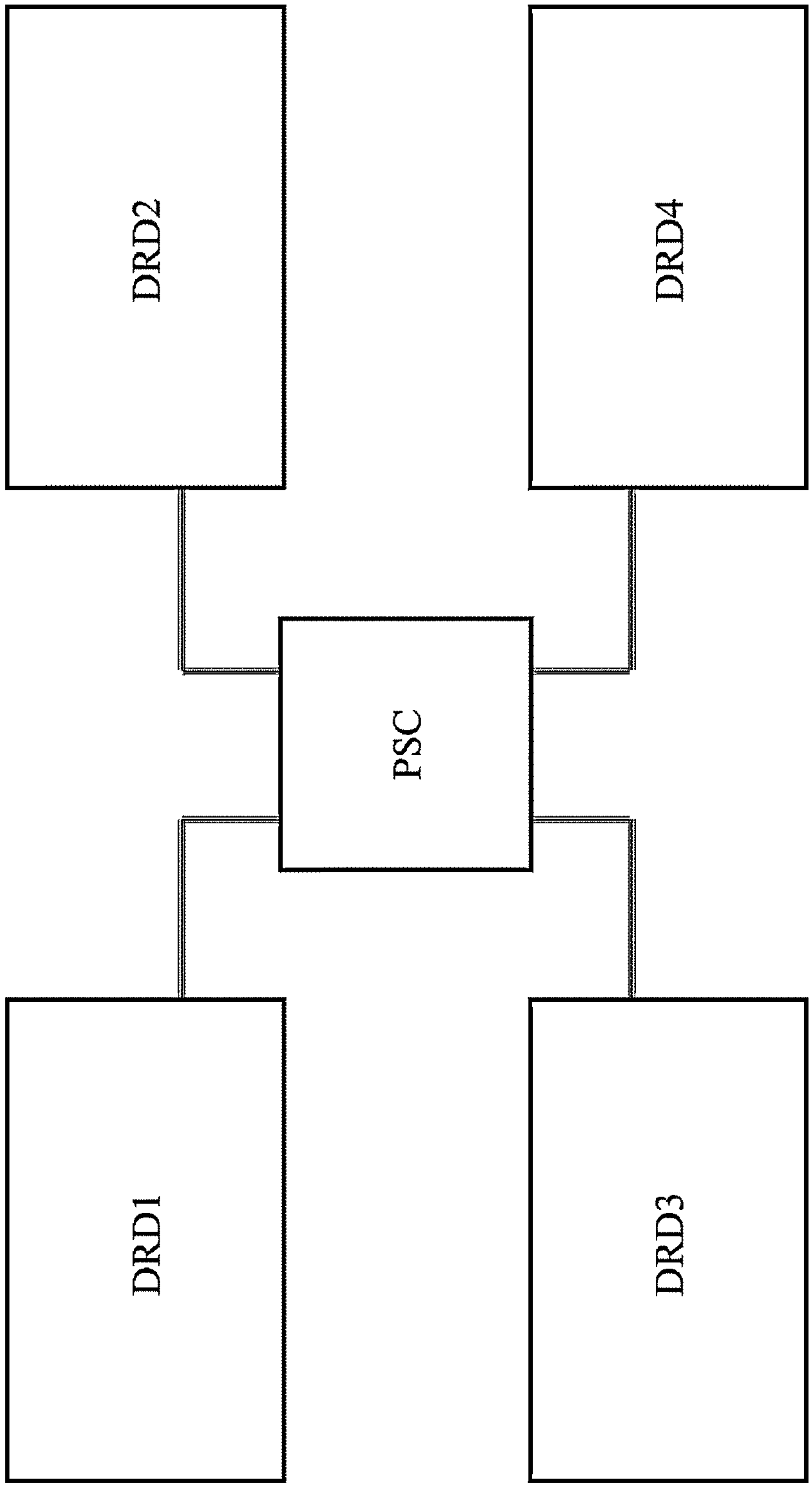
FIG. 27 is a view showing the connection relationship of a power control circuit and display driving devices.

FIG. 27 is a view showing the connection relationship of a power control circuit and display driving devices. FIGS. 28 to 31 are views showing various examples of waveforms of PWM signals generated by reflecting increased time intervals.

Figure 28:
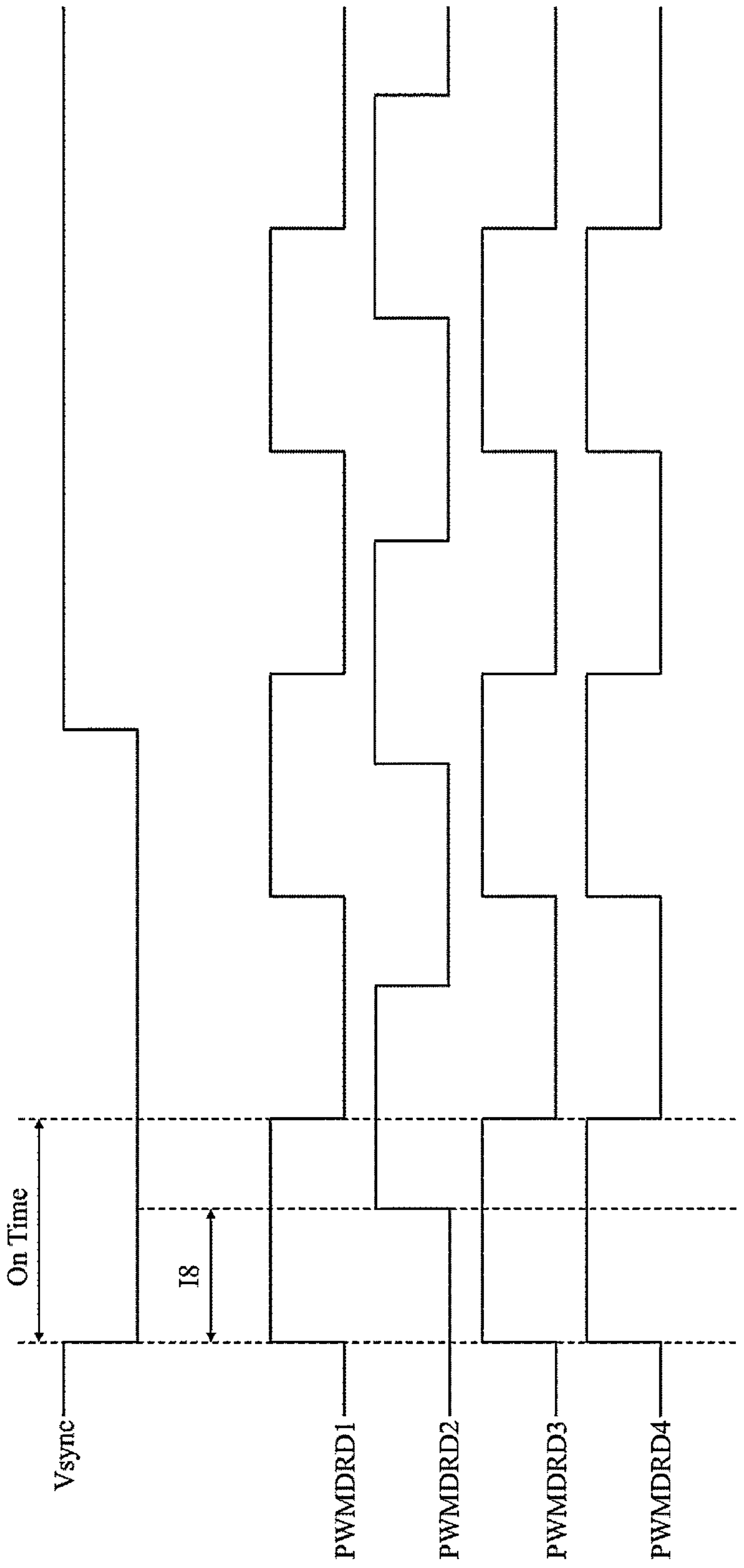
FIGS. 28 to 31 are views showing various examples of waveforms of pulse width modulation signals generated by reflecting increased time intervals.

As shown in FIGS. 27 and 28, the power control circuit PCC may determine the order of the power activation signals to be input to the power circuits based on the determined current consumption values.

As one example, the power control circuit PCC may lastly transmit the power activation signal of the power circuit for driving the display driving device with the greatest current consumption value, without being limited thereto. For example, the current consumption value calculated based on the current value input to the power control circuit PCC may be 1.5 A for the first display driving device DRD1, 1.7 A for the second display driving device DRD2, 0.7 A for the third display driving device DRD3, and 0.8 A for the fourth display driving device DRD4. In an embodiment, based on the determined time interval I8 between the power activation signals, the power control circuit PCC may first transmit the first, third and fourth power activation signals of the first, third and fourth power circuits for driving the first, third and fourth display driving devices DRD1, DRD3 and DRD4 with the relatively low current consumption values and lastly transmit the second power activation signal of the second power circuit for driving the second display driving device DRD2 with the greatest current consumption value.

Figure 29:
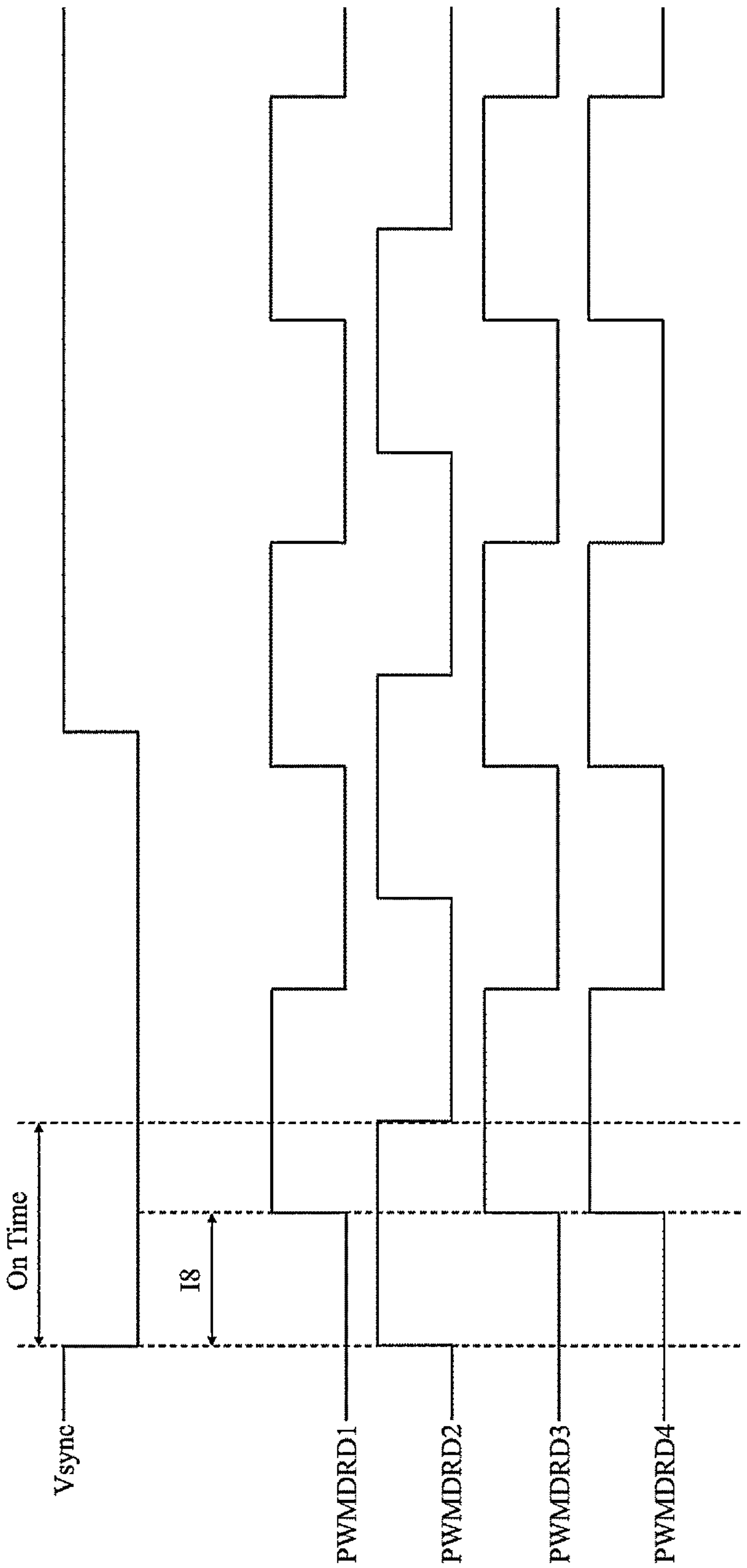

As one example, the power control circuit PCC may first transmit the power activation signal of the power circuit for driving the display driving device with the greatest current consumption value, without being limited thereto. As shown in FIGS. 27 and 29, for example, the current consumption value calculated based on the current value input to the power control circuit PCC may be 1.5 A for the first display driving device DRD1, 1.7 A for the second display driving device DRD2, 0.7 A for the third display driving device DRD3, and 0.8 A for the fourth display driving device DRD4. In an embodiment, based on the determined time interval I8 between the power activation signals, the power control circuit PCC may first transmit the second power activation signal of the second power circuit for driving the second display driving device DRD2 with the greatest current consumption value.

Figure 30:
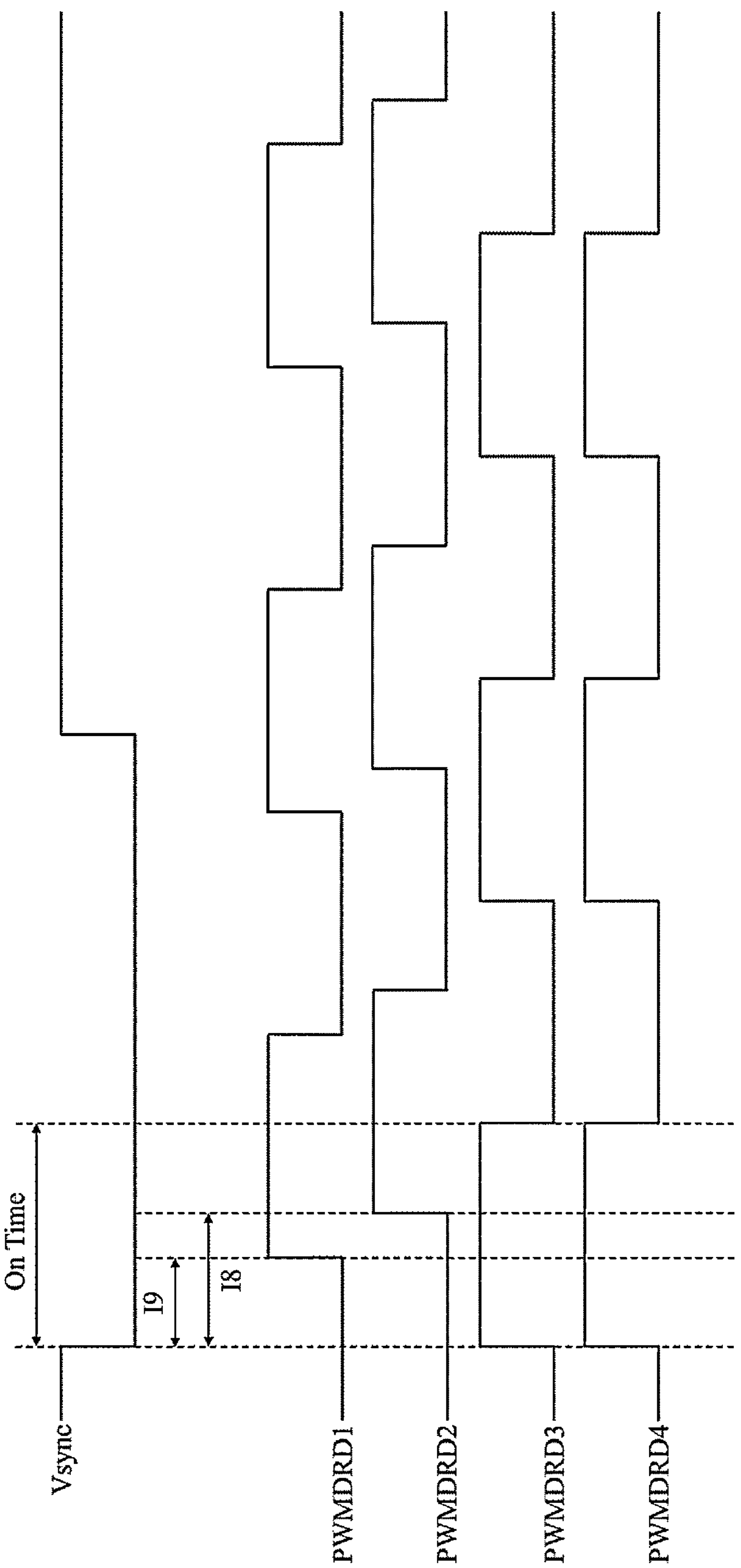

As shown in FIGS. 27 and 30, for example, the current consumption value calculated based on the current value input to the power control circuit PCC may be 1.5 A for the first display driving device DRD1, 1.7 A for the second display driving device DRD2, 0.7 A for the third display driving device DRD3, and 0.8 A for the fourth display driving device DRD4. In an embodiment, based on the determined time intervals I8 and I9 between the power activation signals, the power control circuit PCC may later transmit the second power activation signal of the second power circuit for driving the second display driving device DRD2 with the greatest current consumption value and the first power activation signal of the first power circuit for driving the first display driving device DRD1 with the second greatest current consumption value.

In an embodiment, third and fourth power activation signals of the third and fourth power circuits for driving the third and fourth display driving devices DRD3 and DRD4 may be transmitted first, then the first power activation signal may be transmitted with the first time interval I9, and then the second power activation signal may be transmitted with the second time interval I8. However, the present disclosure is not limited thereto, the third and fourth power activation signals may be transmitted first, then the second power activation signal may be transmitted with the first time interval I9, and then the first power activation signal may be transmitted with the second time interval I8.

Figure 31:
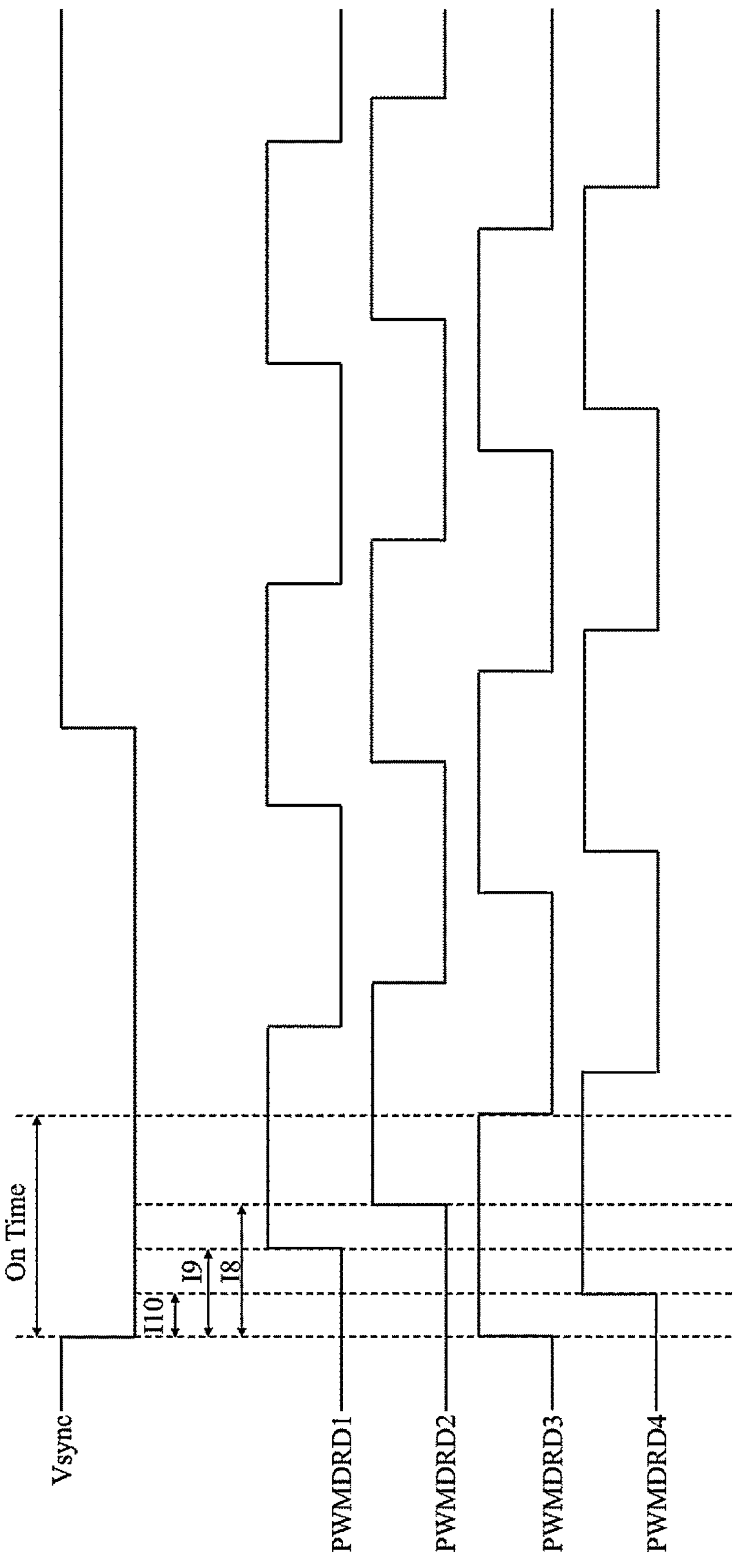

As shown in FIGS. 27 and 31, for example, the current consumption value calculated based on the current value input to the power control circuit PCC may be 1.5 A for the first display driving device DRD1, 1.7 A for the second display driving device DRD2, 0.7 A for the third display driving device DRD3, and 0.8 A for the fourth display driving device DRD4. In an embodiment, based on the determined time intervals I8, I9, and I10 between the power activation signals, the power control circuit PCC may later transmit the second power activation signal of the second power circuit for driving the second display driving device DRD2 with the greatest current consumption value, the first power activation signal of the first power circuit for driving the first display driving device DRD1 with the second greatest current consumption value, and the fourth power activation signal of the fourth power circuit for driving the fourth display driving device DRD4 with the third greatest current consumption value.

In an embodiment, the third power activation signal of the third power circuit for driving the third display driving device DRD3 may be transmitted first, then the fourth power activation signal of the fourth power circuit for driving the fourth display driving device DRD4 may be transmitted with the fourth time interval I10, then the first power activation signal may be transmitted with the first time interval I9, and then the second power activation signal may be transmitted with the second time interval I8. However, the present disclosure is not limited thereto, the second power activation signal may be transmitted first, then the first power activation signal may be transmitted with the fourth time interval I10, then the fourth power activation signal may be transmitted with the first time interval I9, and then the third power activation signal may be transmitted with the second time interval I8.

In the display driving device according to the embodiment, when the time intervals between the power activation signals are present, the transmission order of the power activation signals may be appropriately changed according to an operator.

Figure 32:
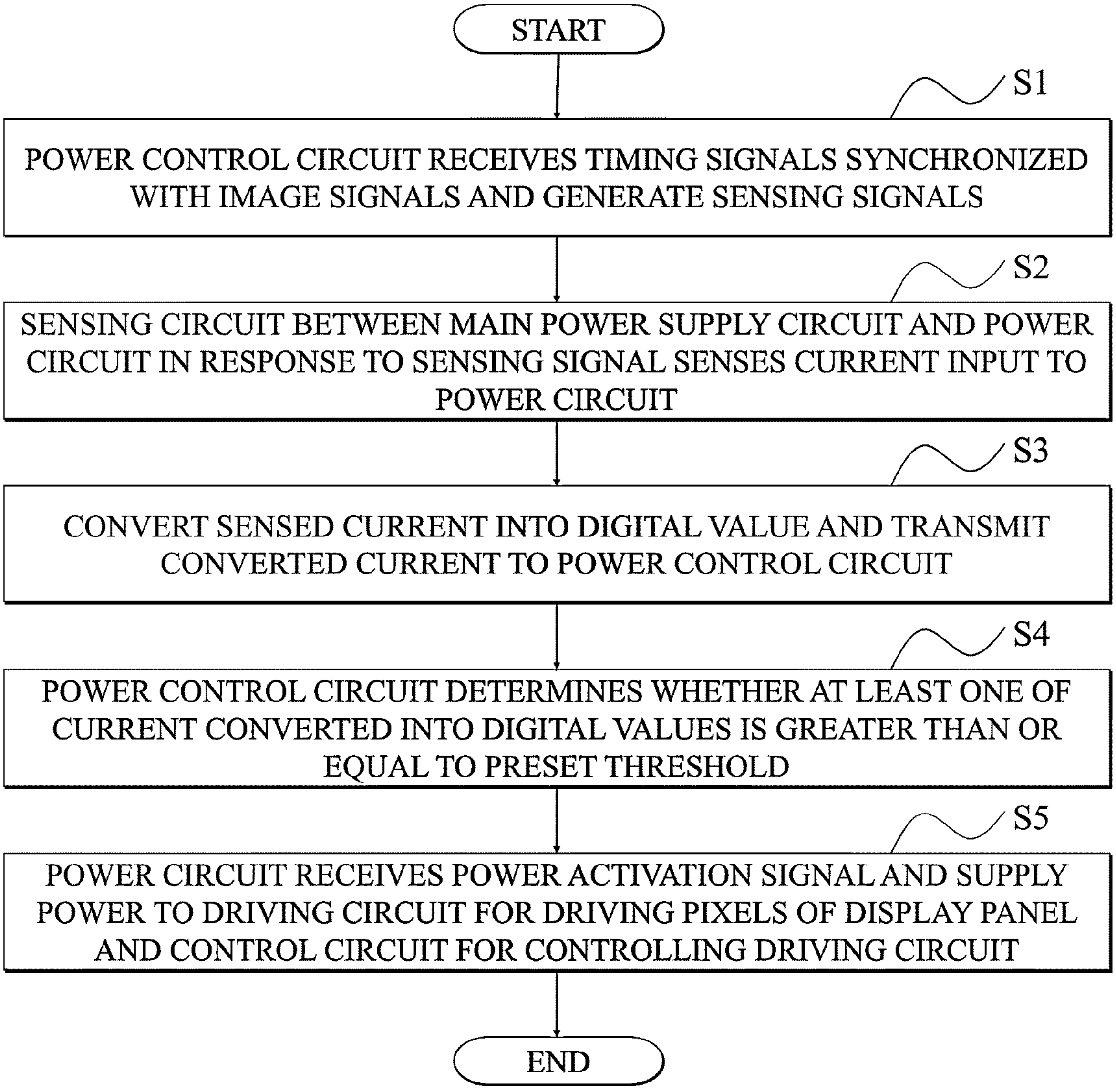
FIG. 32 is a flowchart showing a display driving method according to an example embodiment of the present specification.

FIG. 32 is a flowchart showing a display driving method according to an example embodiment of the present disclosure.

As shown in FIG. 32, the display driving method may include receiving, by a power control circuit, timing signals synchronized with image signals and generating sensing signals (e.g., operation S1).

The display driving method may include sensing, by a first sensing circuit, a first current in response to the sensing signal and sensing, by a second sensing circuit, a second current in response to the sensing signal (e.g., operation S2).

The display driving method may include converting the sensed first current into a digital value and transmitting the converted first current to the power control circuit, and converting the sensed second current into a digital value and transmitting the converted second current to the power control circuit (e.g., operation S3).

The display driving method may include determining, by the power control circuit, whether at least one of the first and second currents converted into the digital values is greater than or equal to a preset threshold (e.g., operation S4).

The display driving method may further include increasing, by the power control circuit, a time interval between the first power activation signal and the second power activation signal when at least one of the first current and the second current is greater than or equal to the preset threshold.

The display driving method may include receiving, a first power circuit, a first power activation and supplying power to a first driving circuit for driving pixels of a first display panel and a first control circuit for controlling the first driving circuit, and receiving, by a second power circuit, a second power activation signal and supplying power to a second driving circuit for driving pixels of a second display panel and a second control circuit for controlling the second driving circuit (e.g., operation S5).

According to example embodiments of the present disclosure, in a display device including a plurality of power circuits, when driving power is applied to the plurality of power circuits from a main power supply circuit, electromagnetic interference (EMI) measured at an external power supply device can be reduced.

According to example embodiments of the present disclosure, in the display device including a plurality of display driving devices, it is possible to reduce noises measured at each display driving device and minimize an increase in noise due to the overlapping of the noises.

It will be apparent to those skilled in the art that the present disclosure is not limited by the above-described example embodiments and the accompanying drawings, and that various substitutions, modifications, and variations can be made in the present disclosure without departing from the spirit or scope of the disclosures. Therefore, the above example embodiments of the present disclosure are provided for illustrative purposes and are not intended to limit the scope or technical concept of the present disclosure. The protective scope of the present disclosure should be construed based on the following claims and their equivalents, and it is intended that the present disclosure cover all modifications and variations of this disclosure that come within the scope of the claims and their equivalents.

What is claimed is:

1. A display driving device, comprising:

a first power circuit configured to supply power to a first driving circuit configured to drive pixels of a first display panel and a first control circuit configured to control the first driving circuit upon receiving a first power activation signal;

a second power circuit configured to supply power to a second driving circuit configured to drive pixels of a second display panel and a second control circuit configured to control the second driving circuit upon receiving a second power activation signal;

a first sensing circuit configured to sense a first current input to the first power circuit;

a second sensing circuit configured to sense a second current input to the second power circuit; and a power control circuit configured to increase a time interval between the first power activation signal and the second power activation signal when at least one of the first current and the second current is greater than or equal to a preset threshold.

2. The display driving device of claim 1, wherein:

the first power activation signal is configured to activate a first pulse width modulation signal generated by the first power circuit; and the second power activation signal is configured to activate a second pulse width modulation signal generated by the second power circuit.

3. The display driving device of claim 2, wherein:

the first pulse width modulation signal is configured to suppress fluctuation of an output voltage of the first power circuit input to the first driving circuit and the first control circuit; and the second pulse width modulation signal is configured to suppress fluctuation of an output voltage of the second power circuit input to the second driving circuit and the second control circuit.

4. The display driving device of claim 2, wherein the time interval between the first power activation signal and the second power activation signal is determined by a frequency of the first pulse width modulation signal and a duty ratio of the first pulse width modulation signal.

5. The display driving device of claim 3, wherein, if a duty ratio of the first pulse width modulation signal is K % ($0<K<100$), the time interval is in a range of 0.2K % to 0.6K % of one cycle of the first pulse width modulation signal.

6. The display driving device of claim 1, wherein:

the first power circuit includes a 1-1 power circuit configured to supply power to the first driving circuit, and a 1-2 power circuit configured to supply power to the first control circuit; and the second power circuit includes a 2-1 power circuit configured to supply power to the second driving circuit, and a 2-2 power circuit configured to supply power to the second control circuit.

7. The display driving device of claim 1, further comprising:

a first analog-digital converter configured to convert the sensed first current into a digital value and transmit the converted first current to the power control circuit; and a second analog-digital converter configured to convert the sensed second current into a digital value and transmit the converted second current to the power control circuit.

8. The display driving device of claim 1, wherein:

the power control circuit is configured to receive a timing signal synchronized with an image signal and to generate a sensing signal;

the first sensing circuit is configured to sense the first current in an active section at a cycle of one frame section in response to the sensing signal; and the second sensing circuit is configured to sense the second current in an active section at a cycle of one frame section in response to the sensing signal.

9. The display driving device of claim 8, wherein the timing signal includes at least one of a gate timing control signal, a data enable signal, a dot clock signal, a vertical synchronization signal, and a horizontal synchronization signal.

10. The display driving device of claim 8, wherein:

the timing signal includes a gate timing control signal; and a frequency of the sensing signal is determined according to a frequency of the gate timing control signal.

11. The display driving device of claim 8, wherein:

the timing signal includes a dot clock signal; and a frequency of the sensing signal is determined according to a frequency of the dot clock signal.

12. The display driving device of claim 8, wherein:

the time interval determined by being sensed in an active section of an $N^{th}$ frame section (N is a natural number of 1 or more) is reflected to a blank section of an $(N+1)^{th}$ frame section; and the first power activation signal and the second power activation signal between which the time interval is present are input to the first power circuit and the second power circuit, respectively, in the blank section of the $(N+1)^{th}$ frame section.

13. A display device, comprising:

a main power supply circuit;

a plurality of display panels;

a plurality of power circuits configured to supply power to a plurality of driving circuits configured to respectively drive pixels of the plurality of display panels, and to a plurality of control circuits configured to respectively control the plurality of driving circuits;

a plurality of sensing circuits each being configured to sense a current input to a corresponding one of the plurality of power circuits; and a power control circuit configured to increase at least one of time intervals between a plurality of power activation signals input to the plurality of power circuits if at least one of the plurality of currents is greater than or equal to a preset threshold.

14. The display device of claim 13, wherein:

the plurality of power circuits include first to third power circuits;

the plurality of power activation signals include a first power activation signal configured to activate a first pulse width modulation signal of the first power circuit, a second power activation signal configured to activate a second pulse width modulation signal of the second power circuit, and a third power activation signal configured to activate a third pulse width modulation signal of the third power circuit; and the power control circuit is configured to increase a time interval between the first power activation signal and the third power activation signal, and a time interval between the second power activation signal and the third power activation signal.

15. The display device of claim 14, wherein the power control circuit is configured to increase a time interval between the first power activation signal and the second power activation signal.

16. The display device of claim 13, wherein the preset threshold is an arithmetic average of the plurality of currents input to each of the plurality of power circuits.

17. A display device, comprising:

an external power supply device including a main power supply circuit configured to output a voltage; and a display driving device operated by receiving the voltage from the external power supply device, wherein the display driving device includes:

a first power circuit configured to supply power to a first driving circuit configured to drive pixels of a first display panel and a first control circuit configured to control the first driving circuit upon receiving a first power activation signal; and a second power circuit configured to supply power to a second driving circuit configured to drive pixels of a second display panel and a second control circuit configured to control the second driving upon receiving a second power activation signal, and wherein the external power supply device includes:

a first sensing circuit disposed between a main power supply circuit and the first power circuit and configured to sense a first current input to the first power circuit;

a second sensing circuit disposed between the main power supply circuit and the second power circuit and configured to sense a second current input to the second power circuit; and a power control circuit configured to increase a time interval between the first power activation signal and the second power activation signal if at least one of the first current and the second current is greater than or equal to a preset threshold.

* * * * *